US007803849B2

(12) United States Patent
Haraguchi

(10) Patent No.: US 7,803,849 B2

(45) Date of Patent: Sep. 28, 2010

(54) ACRYLIC RESIN EXPANDED BEADS, ACRYLIC RESIN EXPANDABLE BEADS, AND METHOD FOR MANUFACTURING FOAMED MOLDED ARTICLE OF ACRYLIC RESIN EXPANDED BEADS

(75) Inventor: Kenji Haraguchi, Yokkaichi (JP)

(73) Assignee: JSP Corporation, Tokyo (JP)

( * ) Notice: Subject to any disclaimer, the term of this patent is extended or adjusted under 35 U.S.C. 154(b) by 628 days.

(21) Appl. No.: 11/790,021

(22) Filed: Apr. 23, 2007

(65) Prior Publication Data

US 2007/0254972 A1 Nov. 1, 2007

(30) Foreign Application Priority Data

Apr. 26, 2006 (JP) ............................ 2006-121566

(51) Int. Cl.
*C08J 9/18* (2006.01)
*C08J 9/00* (2006.01)
*C08J 9/16* (2006.01)
*C08J 9/228* (2006.01)

(52) U.S. Cl. ............................ 521/60; 521/56; 521/76; 521/82

(58) Field of Classification Search .................... 521/60
See application file for complete search history.

(56) References Cited

U.S. PATENT DOCUMENTS 4,312,957 A 1/1982 Spicuzza, Jr.
2005/0153134 A1* 7/2005 Sasaki et al. ................ 428/402

FOREIGN PATENT DOCUMENTS

| | | |
|---|---|---|
| EP | 0 317 042 A1 | 5/1989 |
| EP | 0 761 729 A1 | 3/1997 |
| JP | A 02-182733 | 7/1990 |
| JP | A 04-332751 | 11/1992 |
| JP | B2 2632402 | 4/1997 |
| JP | B2 2730703 | 12/1997 |
| JP | A 2001-233986 | 8/2001 |

* cited by examiner

*Primary Examiner*—Randy Gulakowski
*Assistant Examiner*—Kara Negrelli
(74) *Attorney, Agent, or Firm*—Oliff & Berridge, PLC

(57) ABSTRACT

The present invention is to solve conventional problems, namely, that when an attempt is made to obtain a thick, in-mold foamed molded article with excellent fusibility between beads formed from an acrylic resin expanded beads, cooling takes an extremely long time and production efficiency is poor, and to provide acrylic resin expanded beads with which an in-mold foamed molded article with excellent fusibility between expanded beads can be manufactured in a short cooling time even with a thick foamed molded article such as a block foamed molded article, and the molding cycle can be improved. The acrylic resin expanded beads of the present invention are expanded beads in which an acrylic resin serves as a base resin, and the bead surfaces have continuous ridges in a mesh pattern.

14 Claims, 31 Drawing Sheets

ACRYLIC RESIN EXPANDED BEADS, ACRYLIC RESIN EXPANDABLE BEADS, AND METHOD FOR MANUFACTURING FOAMED MOLDED ARTICLE OF ACRYLIC RESIN EXPANDED BEADS

BACKGROUND OF THE INVENTION

1. Field of the Invention

The present invention relates to acrylic resin expanded beads, acrylic resin expandable beads, and a method for manufacturing a foamed molded article of acrylic resin expanded beads.

2. Description of the Related Art

A model composed of a foamed molded article obtained by filling a metal mold cavity with polystyrene resin expanded beads and heating and molding the beads has been used in the past in a full-mold casting method in which a model is placed in a casting mold, molten metal is allowed to flow into the mold, and a casting is produced while replacing the model in the casting mold with molten metal. With a model of a very large casting, such as a ship's propeller or a press mold, a plurality of foamed molded articles that have a length of 1 or 2 meters, a width of 1 meter, and a thickness of 50 cm (hereinafter such foamed molded articles will be referred to as block foamed molded articles), for instance, are pieced together with an adhesive agent, machined into a large, cuboid foamed molded article of the desired size, and then precisely cut into the desired shape with a milling machine. However, a problem encountered with a full-mold casting method that makes use of a model composed of a foamed molded article of a polystyrene resin is that the polystyrene resin foamed molded article is pyrolyzed and generates soot upon contact with the molten metal during casting, and this soot tends to become admixed in the casting and produce carbon defects therein. Ways to solve this problem have been discussed in, for example, Japanese Laid-Open Patent Application No. 2001-233986, Japanese Patents No. 2,730,703 and No. 2,632,402, which disclose an acrylic resin foamed molded article in which the base resin is a polymethacrylic ester resin that is favorable for use as lost mold or the like in full-mold casting.

SUMMARY OF THE INVENTION

However, a conventional acrylic resin foamed molded article is obtained by what is called an in-mold molding method, in which acrylic resin expandable beads containing a blowing agent are pre-expanded ahead of time, and these are filled in a metal mold cavity, heated, and cooled, but if an attempt is made to obtain one of the above-mentioned block foamed molded articles, cooling take an extremely long time, which decreases productivity, so there was room for improvement to this method. Specifically, in the manufacture of a full-mold casting model by machining a block foamed molded article on a milling machine, end mill, or the like, unless there is adequate fusion between the expanded beads in the block foamed molded article, expanded beads fall out during cutting and an accurate cutting face is not obtained, which then requires repair with putty or the like after machining, and makes the manufacture of the model more complicated. Therefore, a block foamed molded article used for making a model needs to have excellent fusibility between the expanded beads. To obtain a foamed molded article with excellent fusibility between the beads using the expanded beads described in the above-mentioned Japanese Laid-Open Patent Application No. 2001-233986, Japanese Patents No. 2,730,703, and No. 2,632,402, it is necessary to use steam or the like to thoroughly heat all the way to the expanded beads filled in the center part of the metal mold cavity. However, if the heating and molding are performed at a temperature that afford adequate fusion all the way to the expanded beads at the center, then the resulting foamed molded article takes a long time to cool, which is a problem in that it greatly decreases manufacturing efficiency. It is an object of the present invention to provide expanded beads with which these problems encountered in the past can be solved.

Specifically, the essence of the present invention is as follows:

1. Acrylic resin expanded beads in which an acrylic resin serves as a base resin, wherein the bead surfaces have continuous ridges in a mesh pattern.

2. The acrylic resin expanded beads according to Claim 1, wherein the average size of the mesh openings surrounded by ridges is from 4 to 40 μm per opening.

3. The acrylic resin expanded beads according to Claim 1, wherein the base resin is a copolymer of a methacrylic ester monomer and an aromatic vinyl compound.

4. The acrylic resin expanded beads according to Claim 1, wherein the average cell diameter is from 30 to 150 μm per cell.

5. Acrylic resin expandable beads containing a blowing agent for manufacturing acrylic resin expanded beads having continuous ridges in a mesh pattern on the bead surfaces, wherein at least one member selected from among liquid paraffin, higher fatty acid esters, and olefins is added in an amount of 0.1 to 3 parts by weight per 100 parts by weight of a base resin.

6. The acrylic resin expandable beads according to Claim 5, containing an organic physical blowing agent with a boiling point of 80° C. or lower as a blowing agent.

7. The acrylic resin expandable beads according to Claim 5, containing a $C_3$ to $C_6$ hydrocarbon compound as a blowing agent.

8. The acrylic resin expandable beads according to Claim 5, wherein a blowing agent is a pentane.

9. The acrylic resin expandable beads according to Claim 5, wherein an average bead size is from 0.3 to 2 mm.

10. A method for manufacturing a foamed molded article of acrylic resin expanded beads, wherein a mold cavity is filled with the acrylic resin expanded beads according to any of Claims 1 to 4, and the expanded beads are heated within the mold cavity and fuse-bonded together, cooled, and then taken out of the mold cavity.

11. The method for manufacturing a foamed molded article of acrylic resin expanded beads according to claim 10, wherein the smallest dimension of the space inside the mold cavity during in-mold molding is at least 15 cm.

The acrylic resin expanded beads of the present invention allow a foamed molded article with excellent fusibility between the expanded beads to be manufactured in a short cooling time, even with a thick foamed molded article such as a block foamed molded article, and the molding cycle can be improved. Also, the expanded beads of the present invention lend themselves well to pyrolysis, which is an advantage in that less soot is generated during pyrolysis. Therefore, with the expanded beads of the present invention, a foamed molded article that can be cut extremely well and is favorable as a model for full-mold casting can be molded efficiently.

BRIEF DESCRIPTION OF THE DRAWINGS

FIG. 8 is an electron micrograph (magnified 3000 times) of the surface of an expandable bead in Comparative Example 1;

FIG. 21 is an electron micrograph (magnified 500 times) of the surface of an expanded bead in Example 5;

DESCRIPTION OF THE PREFERRED EMBODIMENTS

The acrylic resin that is the base resin of the acrylic resin expanded beads (hereinafter referred to as "expanded beads") of the present invention encompasses not only homopolymers and copolymers produced by polymerization of acrylic acid and/or derivatives thereof, but also copolymers containing at least 50 wt % acrylic acid and/or a copolymer thereof, obtained using acrylic acid and/or a derivative thereof as the main component and other vinyl monomers as secondary components. Examples of "acrylic acid and/or derivatives thereof" include acrylic acid and other such acrylic acid monomers; methacrylic acid and other such methacrylic acid monomers; methyl acrylate, ethyl acrylate, propyl acrylate, butyl acrylate, 2-ethylhexyl acrylate, benzyl acrylate, and other such acrylic ester monomers; and methyl methacrylate, ethyl methacrylate, propyl methacrylate, butyl methacrylate, 2-ethylhexyl methacrylate, benzyl methacrylate, and other such methacrylic ester monomers. The other vinyl monomer mentioned above as a secondary component is preferably an aromatic vinyl monomer. Examples of aromatic vinyl monomers include styrene, α-methylstyrene, o-methylstyrene, m-methylstyrene, p-methylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, styrenesulfonic acid, and sodium styrenesulfonate. The base resin of the expanded beads of the present invention is preferably an acrylic resin containing at least 50 wt % methacrylic ester because it is easier to mold the expanded beads and the resulting foamed molded article has better heat resistance. A copolymer of a methacrylic ester and an aromatic vinyl monomer is especially favorable because high foaming and high expanding is easier and the expanded beads are also easier to be molded, and a copolymer of methyl methacrylate and an aromatic vinyl monomer is particularly good.

The base resin preferably has a weight average molecular weight of 60,000 to 300,000. The strength of the foamed molded article may decrease if the weight average molecular weight is less than 60,000, but if the weight average molecular weight is over 300,000, expandability decreases and it is difficult to obtain expanded beads that have been highly foamed and expanded to the expansion ratio of between 50 and 60, and the fusibility of the beads may decrease in the molding of the expanded beads, lowering the strength of the foamed molded article that is obtained. The base resin of the expanded beads of the present invention even more preferably has a weight average molecular weight of 80,000 to 200,000, because expandability is even better when expanded beads are obtained, and the resulting foamed molded article has even higher strength. The weight average molecular weight of the base resin here is a value calculated for a standard polystyrene, measured by GPC.

Figure 1:
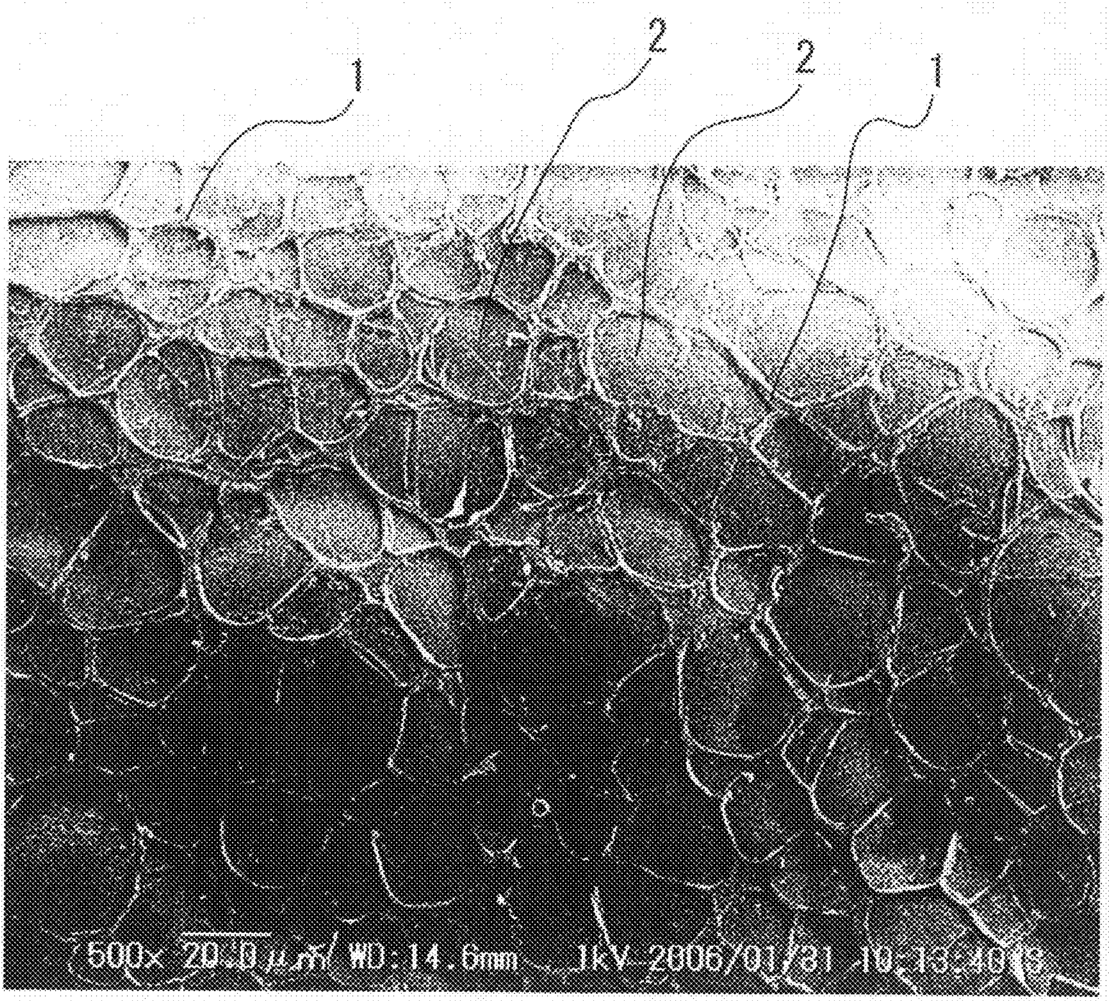
FIG. 1 is an electron micrograph of the surface of an expanded bead, and illustrates the continuous ridges formed in a mesh pattern on the surface of the expanded beads of the present invention.
Figure 5:
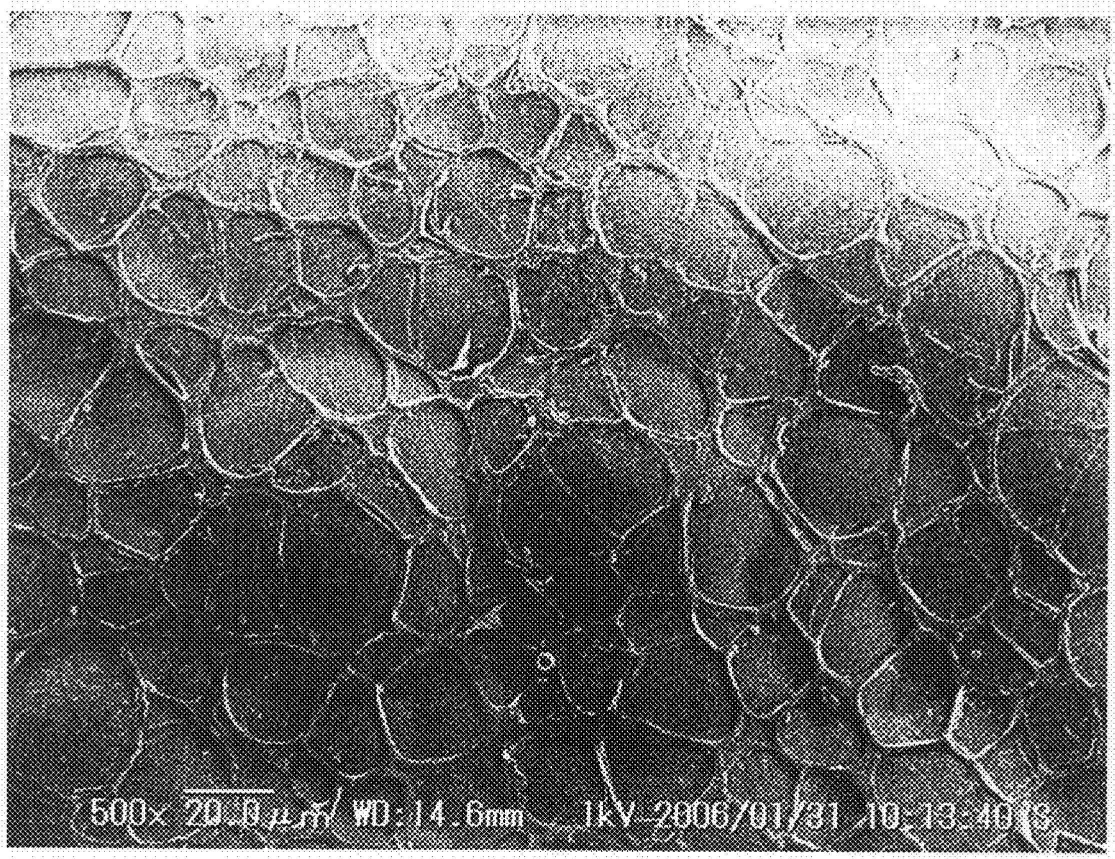
FIG. 5 is an electron micrograph (magnified 500 times) of the surface of an expanded bead in Example 1.

FIG. 1 illustrates the continuous ridges formed in a mesh pattern on the surface of the expanded beads of the present invention, and is an electron micrograph of the surface of an acrylic resin expanded bead obtained in Example 1 (discussed below) (this micrograph is the product of cutting out part of FIG. 5). As shown in FIG. 1, the expanded beads of the present invention have continuous ridges 1 formed in a mesh pattern on their surface. The average size of the mesh openings 2 on the expanded bead surface is preferably 4 to 40 μm per opening, and even more preferably 5 to 30 μm per opening. If the average size of the mesh openings 2 is over 40 μm per opening, there may not be as much of a reduction in the cooling time when the expanded beads are molded. If the average size of the mesh openings 2 is less than 4 μm per opening, the range of molding conditions is narrower, and a foamed molded article with a high degree of fusion may not be obtained. The average size of the mesh openings 2 is found by photographing an expanded bead surface with a scanning electron microscope (preferably at a magnification of 500 times), drawing a straight line on the resulting micrograph (with the line beginning and ending on any ridge, and with no fewer than 10 ridges present on the line), counting the number of mesh openings 2 that intersect this line, dividing the length of the line by the number of mesh openings 2 to find the length per mesh opening, and performing the same operation for 10 expanded beads and taking an average of these. For example, if there are 10 ridges on a 90 μm straight line (the ridges at the beginning and end of the line are also counted), there are 9 mesh openings, in which case 90 μm is divided by 9, so the average size of the mesh openings is 10 μm per opening.

The expanded beads of the present invention, which have the continuous ridges 1 formed in a mesh pattern on their surface, can be obtained by foaming and expanding acrylic resin expandable beads (hereinafter referred to as "expandable beads") that contain a blowing agent and a mixture of one or more compounds selected from the group consisting of liquid paraffin, higher fatty acid esters, and olefins (hereinafter collectively referred to as a "mesh forming agent"). The mesh forming agent not only forms the ridges 1 in a mesh pattern on the expanded bead surface, but also acts as a plasticizer, although its plasticizing effect is not that strong, and has the effect of increasing the expandability of the acrylic resin expandable beads. Examples of liquid paraffin include alicyclic hydrocarbon compounds having a cyclic structure or branched structure and expressed by CmHn ($n<2m+2$, m is the carbon number), and mixtures of these compounds. The average carbon number of the liquid paraffin is preferably from 10 to 40, with a range of 20 to 35 being particularly favorable. When a liquid paraffin whose average carbon number is less than 10 is used, it is more difficult to form the ridges 1 in a mesh pattern on the expanded bead surface, and the time it takes to mold the expanded beads may not be reduced. When a liquid paraffin whose average carbon number is over 40 is used, the mesh opening size on the surface of the obtained expanded beads is smaller and the range of molding conditions becomes narrower, and a foamed molded article with good fusibility of the expanded beads in the center part of the foamed molded article may not be obtained. The above information can be used to adjust the carbon number of the liquid paraffin that is used, and thereby adjust the size of the mesh openings on the resulting expanded beads. Meanwhile, examples of higher fatty acid esters include esters of an alcohol such as butanol, steryl alcohol, glycerol, or sorbitol and a higher fatty acid such as lauric acid, palmitic acid, stearic acid, or behenic acid. The alcohol is preferably a polyhydric alcohol such as glycerol or sorbitol. The carbon number of the higher fatty acid is preferably from 10 to 22. With the present invention, it is particularly favorable for the higher fatty acid ester to be a triglyceride obtained from glycerol and a higher fatty acid in which stearic acid is the main component (this means at least 50 wt % out of the 100 wt % fatty acid) of the constituent fatty acid. The "olefin" refers to one whose carbon number is from 10 to 40, or a mixture of these olefins, and an olefin whose carbon number is from 15 to 35, or a mixture of these olefins, is preferable. When an olefin with a small carbon number is used, it is difficult to form the ridges 1 in a mesh pattern on the expanded bead surface, and there may not be a reduction in the time when it takes to mold the expanded beads. When an olefin with a large carbon number is used, the mesh opening size on the surface of the obtained expanded beads is smaller, resulting in a narrower range of molding conditions, and a foamed molded article with good fusibility of the expanded beads in the center part of the foamed molded article may not be obtained. It is particularly favorable for the olefin to be an α-olefin.

The amount in which the mesh forming agent is added is preferably 0.1 to 3 parts by weight, and even more preferably 0.3 to 2 parts by weight, per 100 parts by weight base resin of the expanded beads. If the amount is within this range, continuous ridges can be easily formed in a mesh pattern on the surface of the obtained expanded beads. If the mesh forming agent is added to the base resin in too small a proportion, ridges may not be formed in a mesh pattern, and expanding efficiency also tend to decrease. On the other hand, if the mesh forming agent is added to the base resin in too large a proportion, the strength and heat resistance of the resulting foamed molded article may decrease and the manufacturing cost may be higher. The liquid paraffin, higher fatty acid ester, olefin, or other mesh forming agent may be added in the step of granulating the resin beads, for example, but is preferably added ahead of time to the raw material monomer prior to the polymerization of the acrylic resin. The amount in which the mesh forming agent is added to the base resin, in a case of adding the mesh forming agent to an acrylic resin, is the proportion per 100 parts by weight acrylic resin, and when the mesh forming agent is added in the course of obtaining an acrylic resin by suspension polymerization, this is the added amount per 100 parts by weight of the total amount of monomer used in the polymerization.

The inventors polymerized the product of adding liquid paraffin to a monomer prior to polymerizing an acrylic resin, impregnated this polymer with a blowing agent, pre-expanded the material, and then molded the expanded beads thus obtained in a mold cavity to manufacture a block foamed molded article, whereupon they made the unexpected discovery that the cooling time is markedly shortened. Cooling during the manufacture of a foamed molded article generally ends once the contact pressure, which is measured with a contact pressure gauge disposed on the inner face of the mold cavity, has decreased to a specific level. Once the cooling has ended, the mold cavity is opened and the foamed molded article is taken out of the mold cavity. When the expanded beads of the present invention are used, the speed at which contact pressure decreases to the specified level after the start of cooling is much faster (that is, the cooling time is much shorter), and surprisingly, there is no deformation of the removed foamed molded article due to insufficient cooling even if the temperature inside the foamed molded article that has been removed from the mold cavity is higher than that of a foamed molded article obtained using conventional expanded beads (expanded beads with no continuous ridges formed in a mesh pattern).

When the surface of the expanded beads of the present invention is observed with an electron microscope, it can be seen that continuous ridges are formed in a mesh pattern on the surface of these expanded beads, and it can be confirmed from an electron micrograph of the expanded bead surface that ridges that appear to originate in the mesh pattern of continuous ridges present on the expanded bead surface are also present on the surface of the foamed molded article obtained from these expanded beads. The reason for the shorter cooling time in the manufacture of a foamed molded article using the expanded beads of the present invention is surmised to be that the continuous ridges in a mesh pattern on the expanded bead surface suppress the swelling force in the interior of the foamed molded article that is still at a high temperature during molding.

Furthermore, when the surface of the expandable beads prior to pre-expanding is similarly observed, countless tiny depressions are seen to be formed in the surface of the expandable beads as well, and observation of a cross section of the expandable beads reveals that at least some of the cells are present between the surface and a location no more than 5 μm in from the surface (these cells between the surface and a location no more than 5 μm in from the surface will hereinafter be called "surface cells"), and many cells are formed that are either closed cells, in which the maximum distance between the inner walls that form the cell is approximately 1 to 10 μm, or open cells having an opening on the surface. This suggests that the depressions formed on the surface of the expandable beads are fairly deep.

Meanwhile, xylene has been added in the past as a plasticizer to expandable beads, and there were also depressions on the surface of these expandable beads, but although many protrusions were formed on the surface of expanded beads obtained by foaming and expanding these expandable beads, continuous ridges could not be formed in a mesh pattern. The inventors discovered that when xylene is added, although depressions are present at the stage of expandable beads, the number of these surface depressions is far smaller than when liquid paraffin is added. Also, when a cross section of expandable beads obtained by adding xylene was observed, almost no surface cells were observed. This fact also suggests that the number of depressions formed on the surface of expandable beads is far smaller than the number of depressions formed on the surface of the expandable beads that are useful in the present invention.

The inventors conducted further research into a mesh forming agent that would form continuous ridges in a mesh pattern on the expanded bead surface, and as a result confirmed that the number of depressions and the size of the mesh openings on the expanded bead surface can be controlled by adjusting the carbon number of the liquid paraffin that is added, and realized that higher fatty acid esters and olefins also function as mesh forming agents. The inventors also found that while the number of depressions formed in the expandable bead surface does increase considerably when D-limonene, di-2-ethylhexyl phthalate, and other such compounds considered useful as plasticizers are added, almost no surface cells were observed, and it was confirmed that continuous ridges could not be formed in a mesh pattern on the surface of the resulting expanded beads. It was also confirmed that liquid paraffin, higher fatty acid esters, and olefins have no effect in terms of forming continuous ridges in a mesh pattern on the resulting expanded bead surfaces when added to polystyrene resin expandable beads.

It is surmised from the above that to achieve the object of the present invention, it is indispensable that there be countless depressions on the surface of the acrylic resin expandable beads, and when a cross section of an expandable bead is observed, that at least some of the cells be present at a section between the surface and a location no more than 5 μm inside from the surface, with these cells being either closed cells, in which the maximum distance between the inner walls that form the cell is approximately 1 to 10 μm, or open cells having an opening on the surface. For the purpose of obtaining expanded beads having continuous ridges formed in a mesh pattern on their surface, it is preferable if from 5 to 200, and more preferably 10 to 150, and even more preferably 20 to 100, surface cells of the acrylic resin expandable beads are present on the expandable bead surface within an arc length of 50 μm from any position on the expandable bead surface. If there are too few surface cells, continuous ridges cannot be formed in a mesh pattern on the expanded bead surface. Also, it is predicted that continuous ridges cannot be formed in a mesh pattern on the expanded bead surface if there are too many surface cells. These surface cells can be observed in an electron micrograph (preferably at a magnification of 1000 times) of a cross section of an expandable bead.

Figure 2:
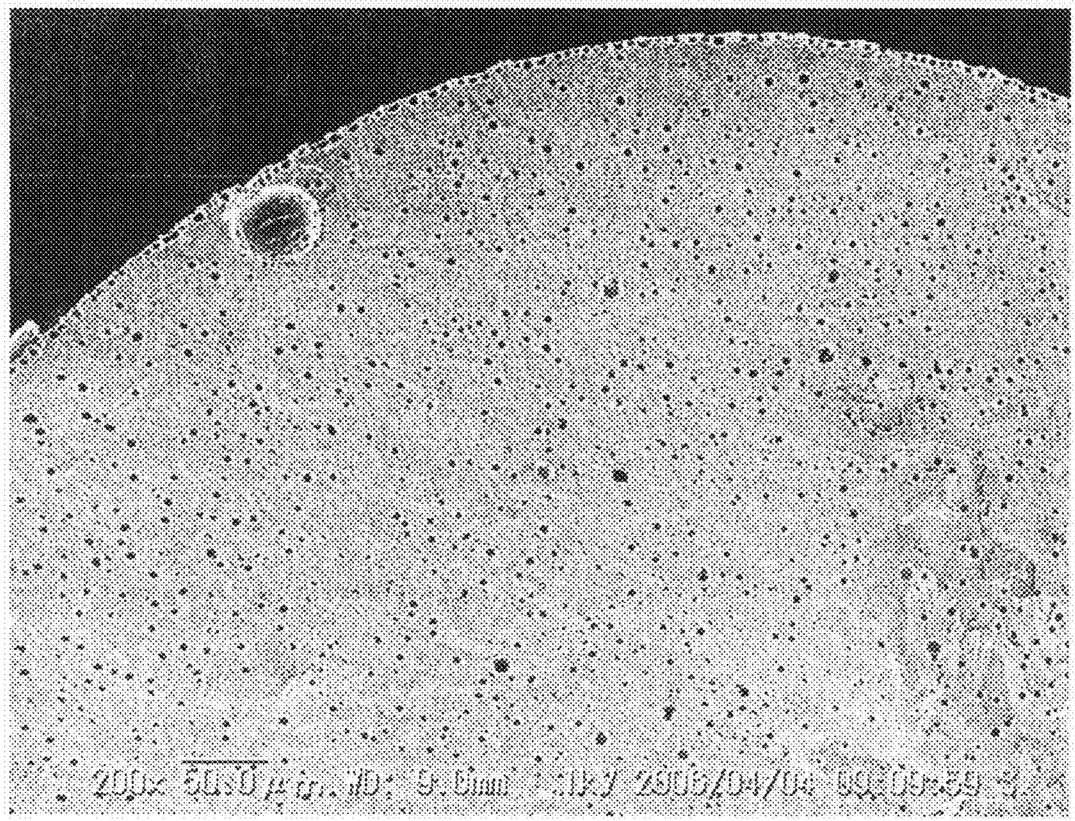
FIG. 2 is an electron micrograph (magnified 200 times) of a cross section of a expandable bead in Example 1.
Figure 3:
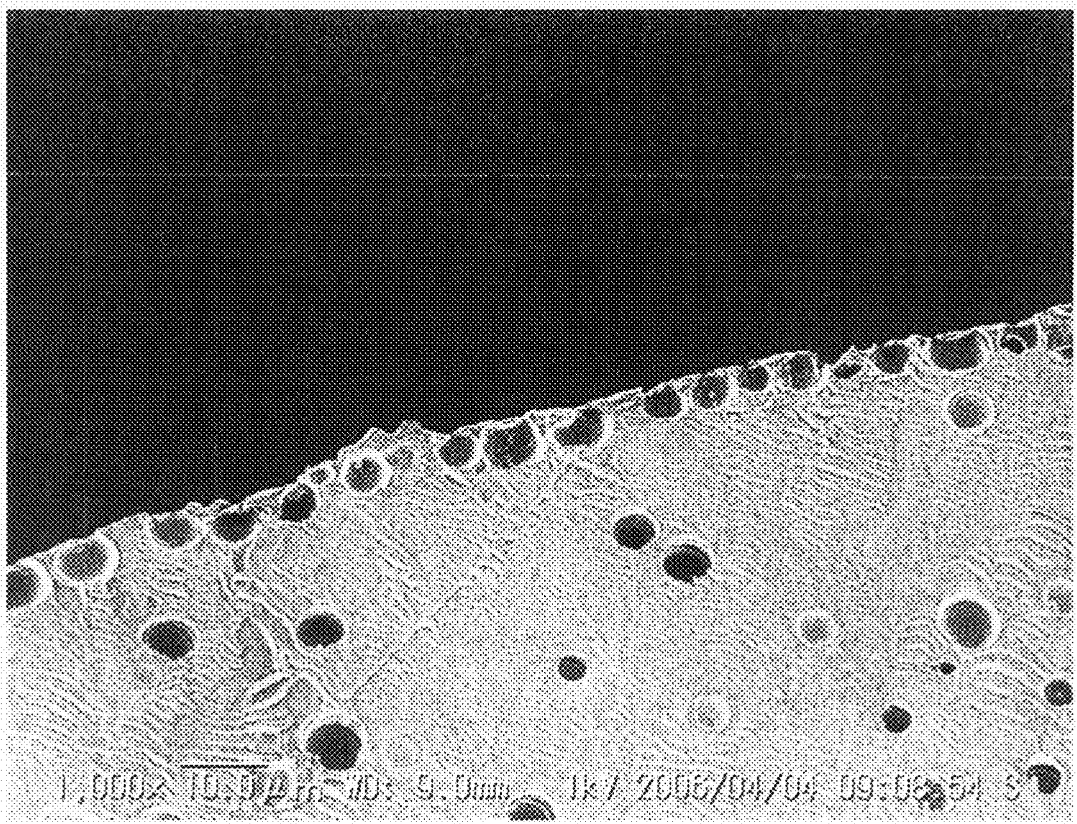
FIG. 3 is an electron micrograph (magnified 1000 times) of a cross section of a expandable bead in Example 1.
Figure 4:
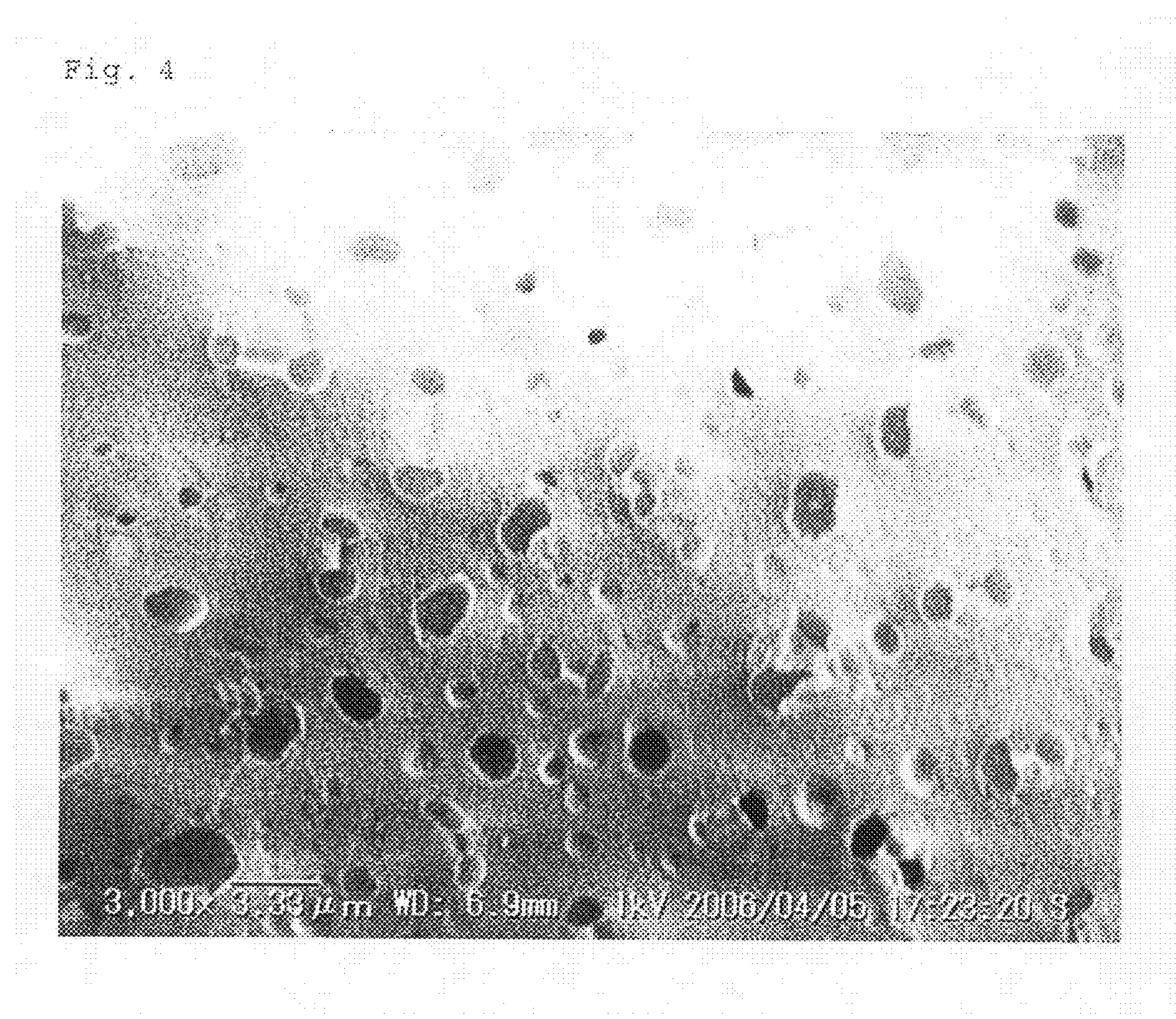
FIG. 4 is an electron micrograph (magnified 3000 times) of the surface of an expandable bead in Example 1.

FIG. 2 is an electron micrograph, magnified 200 times, of a cross section of an expandable bead to which liquid paraffin has been added (the expandable bead in Example 1 below). FIG. 3 is an electron micrograph of the same, magnified 1000 times. FIG. 4 is an electron micrograph of the surface of this expandable bead, magnified 3000 times. FIG. 5 is an electron micrograph of the surface of an expanded bead magnified 500 times obtained in Example 1.

Figure 6:
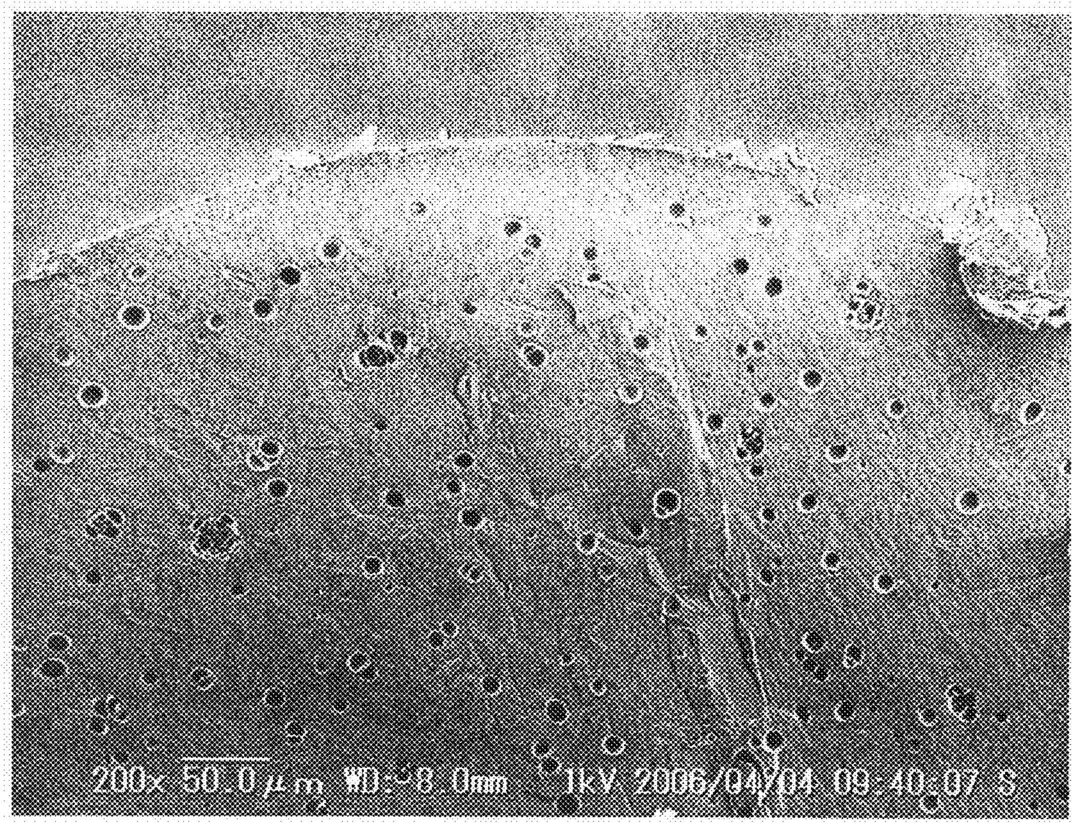
FIG. 6 is an electron micrograph (magnified 200 times) of a cross section of an expandable bead in Comparative Example 1.
Figure 7:
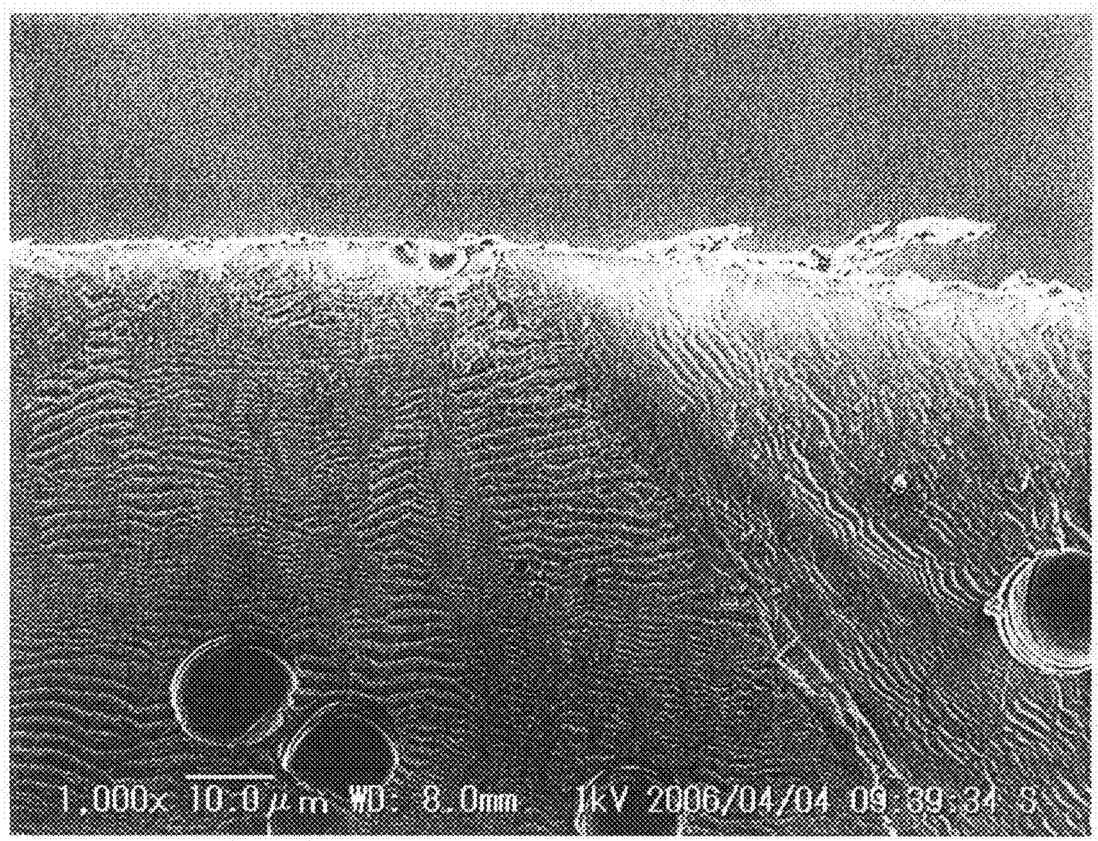
FIG. 7 is an electron micrograph (magnified 1000 times) of a cross section of an expandable bead in Comparative Example 1.
Figure 8:
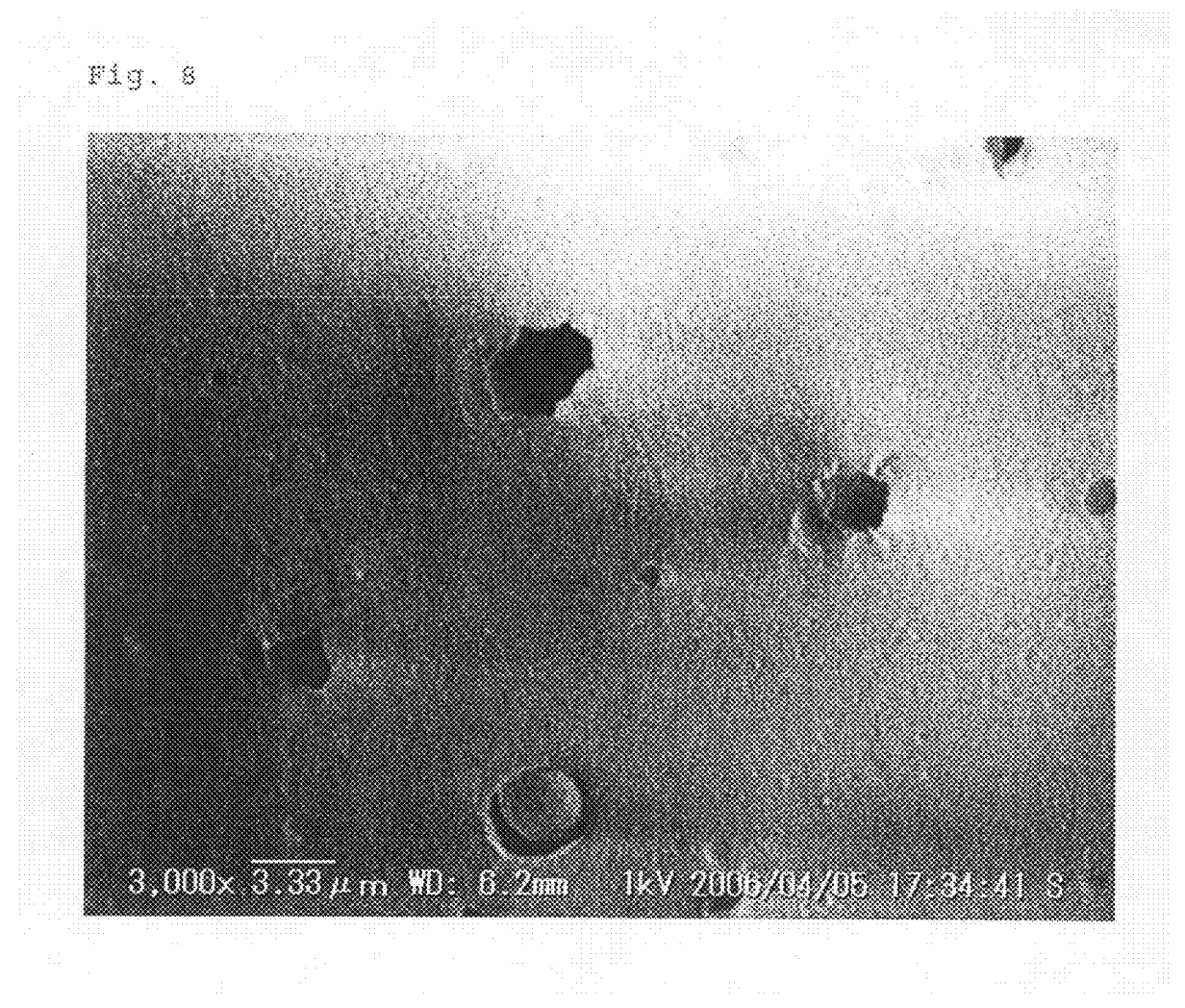
Figure 9:
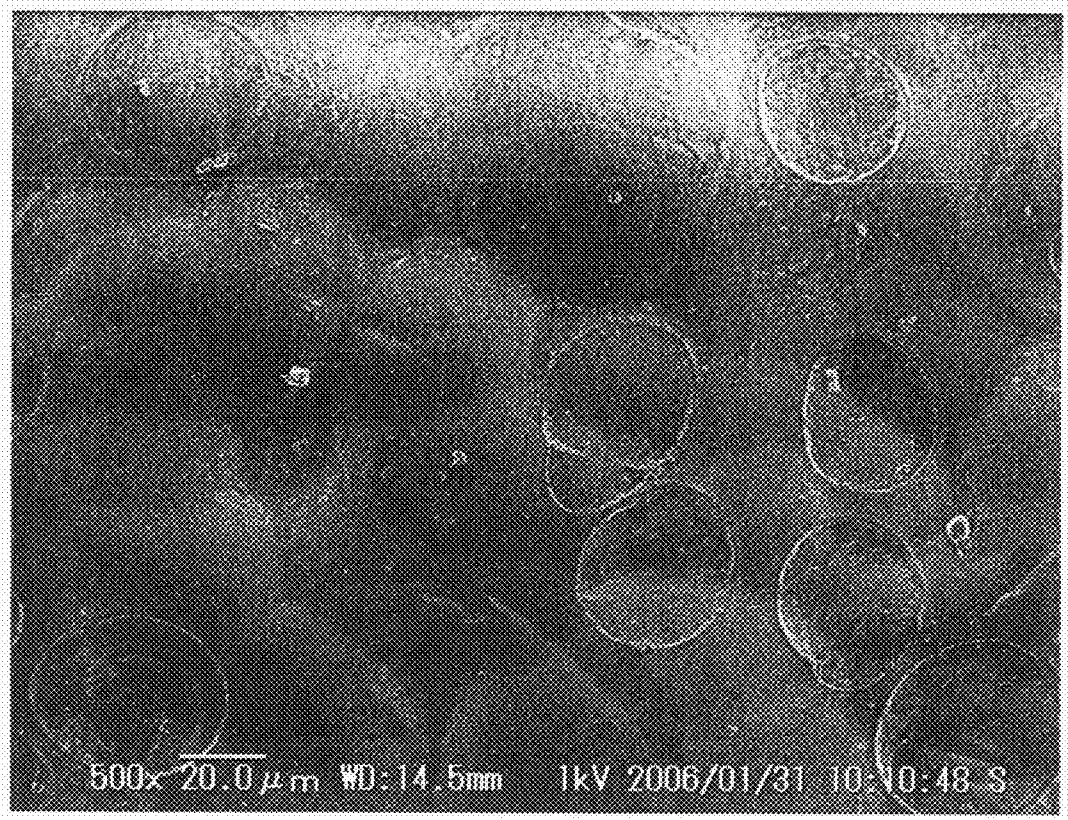
FIG. 9 is an electron micrograph (magnified 500 times) of the surface of an expanded bead in Comparative Example 1.

Meanwhile, FIG. 6 is an electron micrograph, magnified 200 times, of a cross section of an expandable bead to which xylene has been added (the expandable bead in Comparative Example 1 below). FIG. 7 is an electron micrograph of the same, magnified 1000 times. FIG. 8 is an electron micrograph of the surface of this expandable bead, magnified 3000 times. FIG. 9 is an electron micrograph of the surface of an expanded bead magnified 500 times obtained in Comparative Example 1.

A comparison of these drawings reveals that the expandable beads to which liquid paraffin has been added have smaller surface depressions than the expandable beads to which xylene has been added, and that there are considerably more of these depressions, and numerous surface cells are present. Incidentally, if we look and both cross sections, we see that many voids (cells) are formed in the interiors in FIGS. 2, 3, 6, and 7, but the voids shown in FIGS. 2 and 3, which illustrate an example of the present invention, are smaller in size and more plentiful in number. If the voids formed inside the expandable beads are small in size and many in number, there is the possibility that they contribute to reducing the average cell diameter of the resulting expanded beads.

It is not entirely clear why adding liquid paraffin, a higher fatty acid ester, or an olefin forms more tiny depressions in the surface of acrylic resin expandable beads than in the past, and forms more surface cells, but acrylic acid and its derivatives tend to absorb somewhat more water than styrene monomers do, and it is therefore surmised that in the suspension polymerization step in the course of manufacturing the expandable beads, the acrylic acid or its derivative pulls in the water serving as a dispersion medium, and polymerization is concluded in a state in which extremely fine droplets of water are dispersed not only in the interior, but all the way to the surface, and surface depressions and surface cells are formed as a result of this water evaporating during drying at the end of the process. It is surmised that in this polymerization process the liquid paraffin, higher fatty acid ester, or olefin added to the acrylic acid or derivative thereof make the water droplets uniformly finer, and that the water droplets are supported on the polymer surface even at the point when the polymerization is concluded.

The depressions in the surface of the acrylic resin expandable beads can be observed in an electron micrograph (preferably at a magnification of 3000 times) of the surface of an expandable bead. When the surface of an acrylic resin expandable bead is observed in an electron micrograph, an image is taken of expandable bead that has not been covered with zinc stearate, a glycerol ester, or the like. If an image is taken of acrylic resin expandable bead covered with one of the above organic substances, then the acrylic resin expandable beads are stirred and washed in a surfactant aqueous solution (such as a 0.01% aqueous solution of sodium dodecylbenzenesulfonate), then rinsed with water, dewatered, and dried, so that the surface of the acrylic resin expandable bead is not imaged until its covering has been removed.

The acrylic resin expanded beads of the present invention are preferably such that the average diameter of the cells in the expanded beads is from 30 to 150 μm per cell, and even more preferably 40 to 100 μm per cell. If the average cell diameter is less than 30 μm, the range of formation temperature conditions is narrow and there may be a decrease in the degree of fusion of the expanded beads inside the foamed molded article. If the average cell diameter is over 150 μm per cell, however, there may be a decrease in the strength of the foamed molded article that is obtained. The average cell diameter is found by cutting one of the resulting acrylic resin expanded beads through the middle, taking an image of the cut face with a scanning electron microscope, drawing a straight line on the resulting micrograph (with the line beginning and ending on any cell wall, and with no fewer than 20 cells present on the line), counting the number of cells that intersect this line, dividing the length of the line by the number of cells to find the length per cell, and performing the same operation for 10 expanded beads and taking an average of these.

The average cell diameter of the expanded beads that are obtained can be adjusted by varying the type and added amount of a known cell controlling agent. The type and amount of blowing agent used also affect the average cell diameter of the resulting expanded beads. The lower is the miscibility of the blowing agent with the base resin, the smaller the average cell diameter will tend to be. When the blowing agent is a hydrocarbon with 3 to 5 carbons, then the lower the carbon number, the smaller the average cell diameter of the expanded beads tends to be.

If the bulk density of the expanded beads is too low, the foamed molded article obtained by molding the expanded beads is not strong enough, but a bulk density that is too high is disadvantageous in terms of cost, so the bulk density of the expanded beads of the present invention is preferably from 10 to 100 kg/$m^3$. If expanded beads are manufactured by foaming and expanding the expandable beads of the present invention so that the bulk density of the expanded beads is from 10 to 100 kg/$m^3$, then continuous ridges can be easily formed in a mesh pattern on the expanded bead surface.

The expanded beads of the present invention are obtained by heating, foaming and expanding the acrylic resin expandable beads of the present invention. The acrylic resin expandable beads can be obtained, for example, by a known method in which an acrylic ester or methacrylic ester monomer or another such acrylic-based vinyl monomer, or an acrylic-based vinyl monomer and another vinyl monomer, is or are dispersed in an aqueous medium in the presence of a suitable suspension agent along with a plasticizer and a polymerization initiator, after which the polymerization reaction is commenced, and a blowing agent is added either during or after completion of the polymerization to create acrylic resin expandable beads.

The above-mentioned polymerization initiator is one that is soluble in a vinyl monomer and whose 10-hour half-life temperature is from 50 to 120° C., examples of which include cumene hydroxyperoxide, dicumyl peroxide, t-butyl peroxy-2-ethylhexanoate, t-butyl peroxybenzoate, benzoyl peroxide, t-butyl peroxyisopropylcarbonate, t-butyl peroxy-2-ethylhexylmonocarbonate, t-amyl peroxy-2-ethylhexylcarbonate, hexyl peroxy-2-ethylhexylcarbonate, lauroyl peroxide, and other such organic peroxides, and azobisisobutyronitrile and other such azo compounds. These polymerization initiators can be used singly or in combinations of two or more types. The polymerization initiator is preferably used in an amount of 0.01 to 3 parts by weight per 100 parts by weight vinyl monomer. The suspension agent can be, for example, a polyvinyl alcohol, methyl cellulose, polyvinylpyrrolidone, or another such hydrophilic polymer, or tertiary calcium phosphate, magnesium pyrogallate, or another such inorganic salt with poor water solubility, and may be used together with a surfactant as needed. If an inorganic salt with poor water solubility is used, it is preferably used together with sodium alkylsulfonate, sodium dodecylbenzenesulfonate, disodium dodecyldiphenyl ether sulfonate, sodium α-olefinsulfonate, or another such anionic surfactant. The suspension agent is preferably used in an amount of 0.01 to 5 parts by weight per 100 parts by weight vinyl monomer. If the above-mentioned inorganic salt with poor water solubility is used together with an anionic surfactant, it is preferable to use the inorganic salt with poor water solubility in an amount of 0.05 to 3 parts by weight, and the anionic surfactant 0.0001 to 0.5 part by weight, per 100 parts by weight vinyl monomer. In the polymerization step in which the above-mentioned acrylic resin expandable beads are obtained, hexabromocyclododecane or another such flame retardant, 2,3-dimethyl-2,3-diphenylbutane or another such flame retardant auxiliary, a methyl methacrylate copolymer, polyethylene wax, talc, silica, ethylenebistearamide, silicone, or another cell controlling agent, plasticizer, antistatic agent, electric conducting agent, bead size distribution controlling agent, chain transfer agent, polymerization inhibitor, or other additives that are commonly used in the manufacture of styrene resin expandable beads may be added, or butadiene rubber, styrene-butadiene rubber, or another such rubber component may be added.

The blowing agent contained in the acrylic resin expandable beads is preferably an organic physical blowing agent with a boiling point of 80° C. or lower. Examples of organic physical blowing agents with a boiling point of 80° C. or lower include methane, ethane, propane, n-butane, isobutane, cyclobutane, n-pentane, isopentane, neopentane, cyclopentane, n-hexane, cyclohexane, and other such saturated hydrocarbon compounds; methanol, ethanol, and other such lower alcohols; and dimethyl ether, diethyl ether, and other such ether compounds. These organic compounds with a boiling point of 80° C. or lower can be used singly or in combinations of two or more types. A hydrocarbon compound with a carbon number of 3 to 6 is particularly favorable as the blowing agent, and of these, pentane is best of all because the average cell diameter of the resulting expanded beads is not too small. The amount in which the blowing agent is contained in the acrylic resin expandable beads is determined by the relationship to the desired expansion ratio of the expanded beads to be obtained. The blowing agent content is raised if expanded beads with a high expansion ratio are to be obtained, and the blowing agent content is lowered if expanded beads with a low expansion ratio are to be obtained. The blowing agent content in the acrylic resin expandable beads is usually 2 to 15 wt %, and preferably 3 to 8 wt %.

The acrylic resin expandable beads preferably have an average bead size of 0.3 to 2 mm, and even more preferably 0.5 to 1.5 mm. Expanding efficiency tends to decrease if the average bead size is too small. If the average bead size is too large, the expanded beads are too large and are not filled as well into the mold cavity.

An example of how the above-mentioned acrylic resin expandable beads are heated, foamed and expanded is a method in which a cylindrical pre-expanding machine equipped with a stirring device is used to heat, foam and expand the expandable beads with steam or the like under stirring. A so-called in-mold molding method, in which a mold cavity is filled with acrylic resin expanded beads, the expanded beads are heated and fuse-bonded together in the mold cavity, and the foamed molded article is taken out of the mold cavity after cooling, may be employed to obtain a foamed molded article from the expanded beads of the present invention. In particular, if the expanded beads of the present invention are used, the cooling time required during in-mold molding can be markedly reduced. This advantage naturally is achieved when obtaining a thin foamed molded article (one with a thickness of 1 cm to less than 15 cm), but is even more significant when a thick foamed molded article is obtained (one with a thickness of 15 cm or greater). A suitable thickness of the foamed molded article that is to be obtained is from 15 to 100 cm, and a range of 20 to 70 cm is preferable. An example of a large foamed molded article is a polystyrene resin foamed molded article used for EPS construction. Since this foamed molded article has a length of 1 or 2 meters, a width of 1 meter, and a thickness of 50 cm, molding devices for manufacturing such foamed molded articles have come into widespread use. Even when a foamed molded article with a length of 1 or 2 meters, a width of 1 meter, and a thickness of 50 cm is manufactured using this molding device and the expanded beads of the present invention, such that fusion is good all the way to the expanded beads in the center, cooling only takes a very short time after the molding step.

EXAMPLES

The present invention will now be described in further detail through examples and comparative examples.

Example 1

430 kg of deionized water, 0.4 kg of tertiary calcium phosphate (made by Taihei Kagaku Sangyo; used as a suspension agent), 70 g of disodium dodecyldiphenyl ether sulfonate (Pelex SSH, made by Kao, 50% aqueous solution; used as a surfactant), and 0.65 kg of sodium acetate (used as electrolyte) were poured into an autoclave with an internal volume of 1 cubic meter and equipped with a stirrer. Next, 1.5 kg of benzoyl peroxide (Nyper BW, made by NOF Corp., water-diluted powder) and 0.4 kg of t-butyl peroxy-2-ethylhexyl-monocarbonate (Perbutyl E, made by NOF Corp.) (both used as polymerization initiators), 3.1 kg of liquid paraffin (Moresco White P60, made by Matsumura Oil Research, average carbon number of 20; used as a mesh forming agent), and 0.6 kg of α-methylstyrene dimer (Nofiner MSD, made by NOF Corp.; used as a chain transfer agent) were dissolved in 233 kg of methyl methacrylate, 56 kg of styrene, and 22 kg of α-methylstyrene, and this solution was poured into the autoclave while the stirrer stirred the contents at 110 rpm. The inside of the autoclave was replaced with nitrogen, after which the temperature was raised to 80° C. over a period of one and a half hours. During this temperature elevation to 80° C., at the point when 60° C. was reached, 0.8 kg of a 0.02% aqueous solution of potassium persulfate was added as a suspension auxiliary. After 80° C. was reached, the temperature was further raised to 115° C. over 6 hours, and then held at 115° C. for 5 hours, after which the system was cooled for about 6 hours to 30° C. During the temperature elevation from 80° C. to 115° C., at the point when 110° C. was reached, 37 kg of pentane (a mixture of 80% n-pentane and 20% isopentane) was added as a blowing agent to the autoclave over a period of about 60 minutes. After the addition of the blowing agent, the stirring speed was lowered to 90 rpm. After cooling, the contents were taken out, nitric acid was added to dissolve the tertiary calcium phosphate adhering to the surface of the acrylic resin expandable beads, and then this product was dewatered and washed in a centrifuge and any water adhering to the surface was removed with an air flow dryer, which gave acrylic resin expandable beads with an average bead size of about 0.8 mm. The acrylic resin expandable beads thus obtained were sifted to separate out the expandable beads with a diameter of 0.5 to 1.2 mm. 0.015 part by weight of N,N-bis(2-hydroxyethyl)alkylamine was added as an anti-static agent to 100 parts by weight of these acrylic resin expandable beads, and this product was covered with a mixture of 0.2 part of weight zinc stearate and 0.1 part by weight glycerol monostearate. 12.5 kg of the acrylic resin expandable beads thus obtained were put in a pressurized batch expanding machine (DYH850, made by Daisen Kogyo), steam was supplied so that the internal pressure of the expanding machine was 0.01 MPa (gauge pressure), and the expandable beads were heated, foamed and expanded while the steam pressure was maintained for about 80 seconds, which gave acrylic resin expanded beads with a bulk density of about 20 kg/$m^3$.

The expanded beads thus obtained were put in an aging silo and aged for 1 day at room temperature, after which they were molded into a block foamed molded article using a block molding machine (VS-2000-5VMC, made by Daisen Kogyo). The mold dimensions of the block molding machine were 2.0 meters high by 1.0 meter wide by 0.5 meter thick, and heating and parting were controlled with a contact pressure gauge attached to the center part of a 2.0×1.0 meter face of the mold cavity. Heating was performed by supplying heating steam into the mold cavity until the inflating pressure of the expanded beads of acrylic resin filled in the mold cavity reached the maximum contact pressure shown in Table 1, after which water cooling was performed for 3 seconds, and then inside of the mold cavity was reduced in pressure to −0.06 MPa (gauge pressure), and the reduced pressure state was maintained until the contact pressure gauge reached 0.00 MPa (gauge pressure), after which the mold cavity was opened and the block foamed molded article was taken out. This block foamed molded article was dried for 1 day at 60° C., after which it was cured for at least 1 day at room temperature, and then various measurements were performed, the results of which are given in Table 1. Scanning electron micrographs of the surface and cross section of the acrylic resin expandable beads and the surface of the expanded beads obtained in Example 1 are shown, respectively, in FIG. 4 (magnified 3000 times), FIG. 3 (magnified 1000 times), and FIG. 5 (magnified 500 times).

TABLE 1

| | Example 1 | | | Example 2 | | | Example 3 | | |
|---|---|---|---|---|---|---|---|---|---|
| Type of mesh forming agent | liquid paraffin ($C_{20}$) | | | liquid paraffin ($C_{25}$) | | | liquid paraffin ($C_{33}$) | | |
| Added amount of mesh forming agent (parts by weight) | 1.0 | | | 1.0 | | | 1.0 | | |
| Blowing agent content (wt %) | 8.0 | | | 8.2 | | | 8.3 | | |
| Number average molecular weight (Mn) | 28,000 | | | 38,000 | | | 29,000 | | |
| Weight average molecular weight (Mw) | 82,000 | | | 88,000 | | | 85,000 | | |
| Z average molecular weight (Mz) | 175,000 | | | 177,000 | | | 180,000 | | |
| Depression density (No./mm$^2$) | $1.0 \times 10^5$ | | | $1.9 \times 10^5$ | | | $2.3 \times 10^5$ | | |
| Bulk density of expanded beads (kg/m$^3$) | 20.0 | | | 21.1 | | | 21.3 | | |
| Average size of mesh openings on expanded bead surface (μm/opening) | 17 | | | 11 | | | 10 | | |
| Average size of expanded beads (μm/bead) | 65 | | | 56 | | | 54 | | |
| Max. contact pressure during molding and heating (MPa) | 0.093 | 0.098 | 0.103 | 0.093 | 0.098 | 0.103 | 0.093 | 0.098 | 0.103 |
| Cooling time during molding (min) | 1.3 | 5.3 | 6.7 | 1.0 | 2.0 | 3.5 | 0.9 | 1.2 | 2.3 |
| Shrinkage (%) | 0.2 | 0.3 | 0.3 | 0.5 | 0.5 | 0.7 | 0.2 | 0.4 | 0.3 |
| Internal fusion ratio of block foamed molded article (%) | 25 | 50 | 65 | 10 | 40 | 55 | 10 | 35 | 50 |
| Flexural strength of block foamed molded article (MPa) | — | 0.20 | — | — | — | 0.20 | — | — | 0.21 |

The various measurements shown in the table but not described above were carried out as follows.

Depression Density:

A scanning electron microscope was used to take an image (magnified 3000 times) of the surface of an acrylic resin expandable bead not covered with zinc stearate or glycerol monostearate, the number of depressions on the inside of a square measuring 20 μm on one side on the electron micrograph (magnified 3000 times) were counted, and this number was converted into the number per square millimeter. In this measurement, the inventors counted the number of depressions located on any two touching sides of a square measuring 20 μm on each side, and did not count depressions located on the other two sides of the same square. The same measurement was taken at at least five different places on the surface, and the arithmetic mean thereof was used as the depression density.

Blowing Agent Content in Acrylic Resin Expandable Beads:

The acrylic resin expandable beads thus obtained were dissolved in dimethylformamide, the content of the added blowing agent component was measured by gas chromatography, and the content of the various components (wt %) was totaled.

Average Molecular Weight of Base Resin of Acrylic Resin Expandable Beads:

The acrylic resin expandable beads thus obtained were dissolved in tetrahydrofuran and subjected to gel permeation chromatography (GPC) to find the number average molecular weight, the weight average molecular weight, and the Z average molecular weight, corrected with standard polystyrene.

Bulk Density of Expanded Beads:

The expanded beads were filled into a 1 L graduated cylinder up to the 1 L marking, the weight WP (g) of these expanded beads was measured to the 0.1 g level, and the bulk density (kg/m$^3$) of the expanded beads was found from the weight WP of the expanded beads by using the following equation.

$$\text{Bulk density of expanded beads (kg/m}^3\text{)}=\{WP(\text{g})\times 0.001\ (\text{kg/g})\}/\{1\ (\text{L})\times 0.001\ (\text{L/m}^3)\}$$

Cooling (Reduced Pressure Cooling) During Molding:

This is expressed by the time (minutes) required from the start of pressure reduction of the mold cavity until the contact pressure reached 0.00 MPa (gauge pressure) after steam heating and water cooling in the step of producing a block foamed molded article.

Shrinkage:

The length (mm) of the obtained block foamed molded article along the 2.0 meter of length of the mold cavity was measured, this measurement value was termed the foamed molded article size, and the shrinkage (%) with respect to the mold cavity size (2.0 meters) was found from the following equation.

$$\text{Shrinkage (\%)}=(\text{mold cavity size}-\text{foamed molded article size})/\text{mold cavity size}\times 100$$

Internal Fusion Ratio of Block Foamed Molded Article:

The obtained block foamed molded article was sliced with a nichrome wire into ten slices each measuring 5 cm in thickness. The fifth slice from the top was split, at least 100 of the expanded beads at the fracture plane were visually observed to count the number of expanded beads broken themselves and the number of separations at the interface between expanded beads, and the proportion of the number of expanded beads that broke themselves versus the total number of expanded beads measured was used as the internal fusion ratio (%). The permissible range for this internal fusion ratio is usually at least 50%.

Flexural Strength of Block Foamed Molded Article:

A three-point flexural test was conducted as set forth in JIS K 7221. Specifically, a block foamed molded article was cut with a nichrome wire into a test piece measuring 300 mm×75 mm×25 mm, a three-point flexural test (200 mm span) was conducted, and the maximum flexural stress (MPa) was measured. The same test was conducted on five test pieces, and the average flexural strength (MPa) was found.

Example 2

Figure 10:
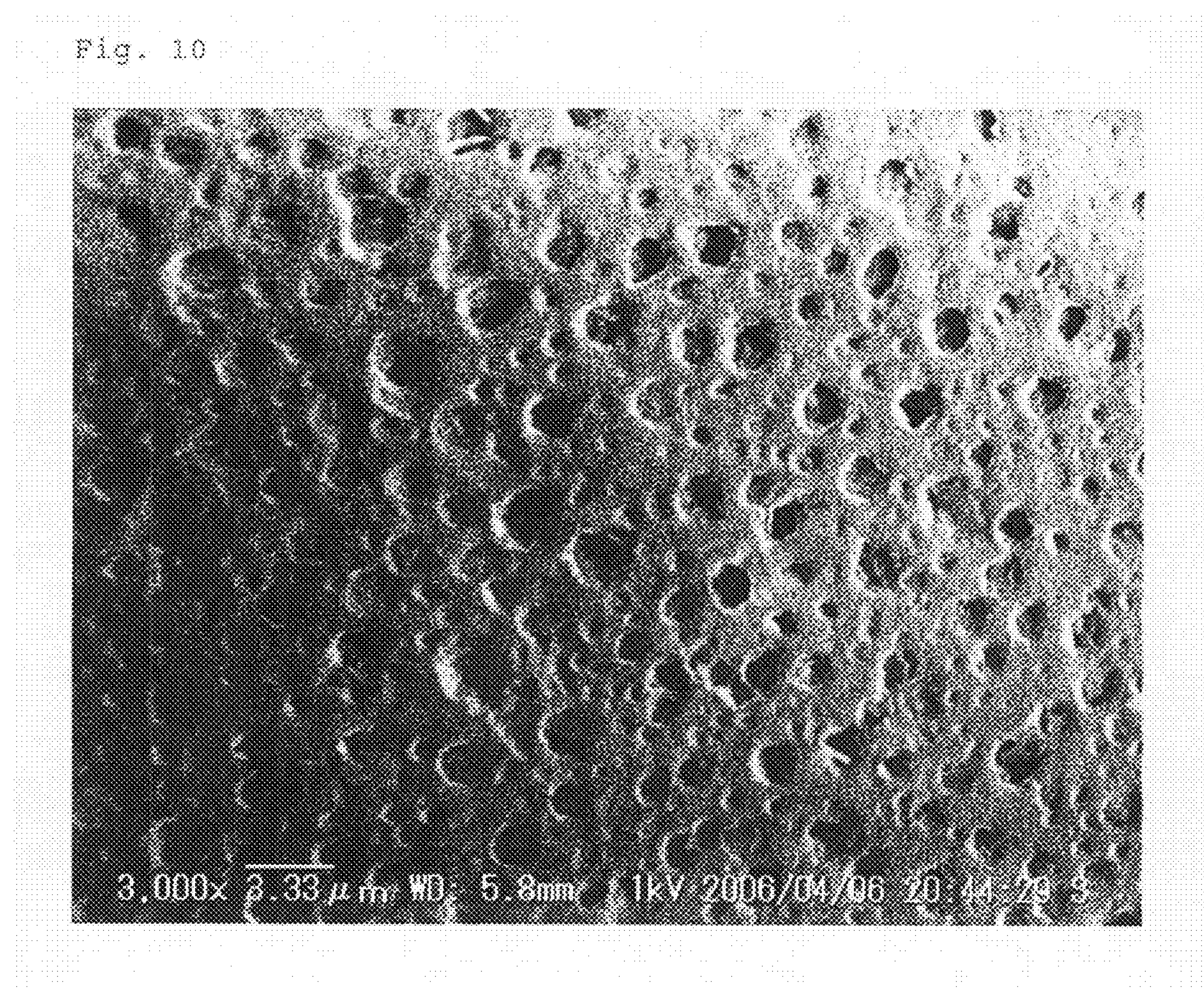
FIG. 10 is an electron micrograph (magnified 3000 times) of the surface of an expandable bead in Example 2.
Figure 11:
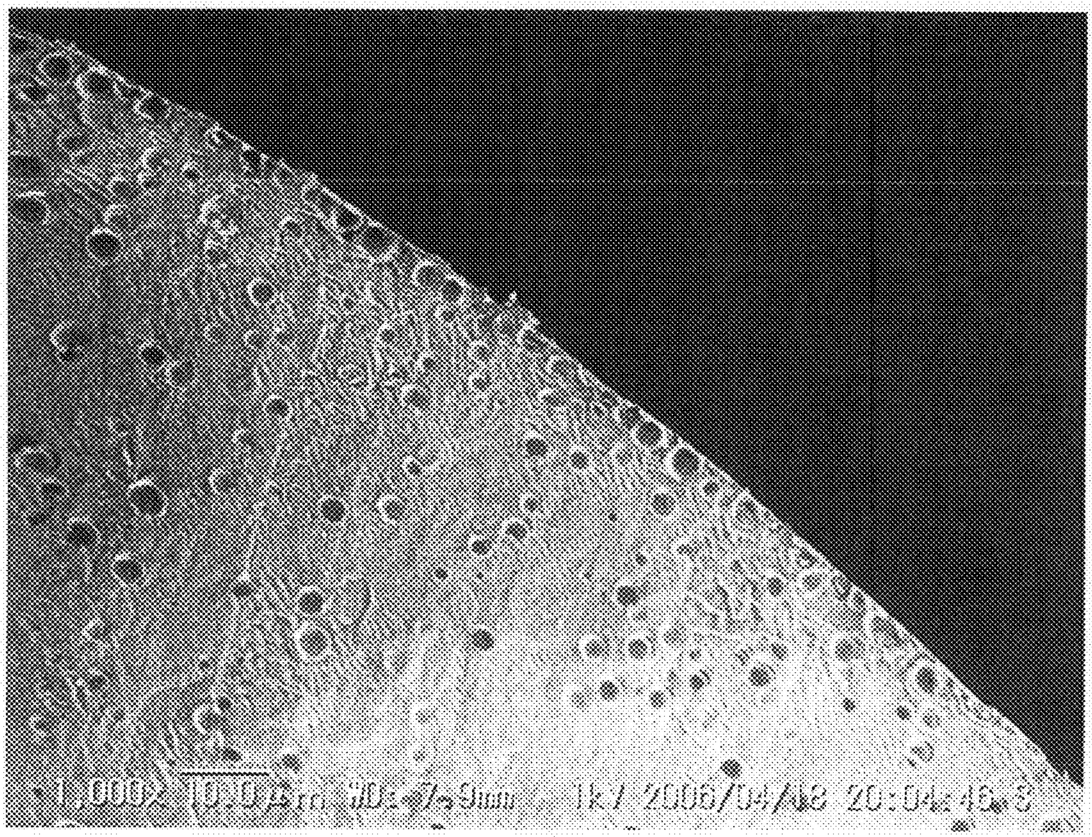
FIG. 11 is an electron micrograph (magnified 1000 times) of a cross section of an expandable bead in Example 2.
Figure 12:
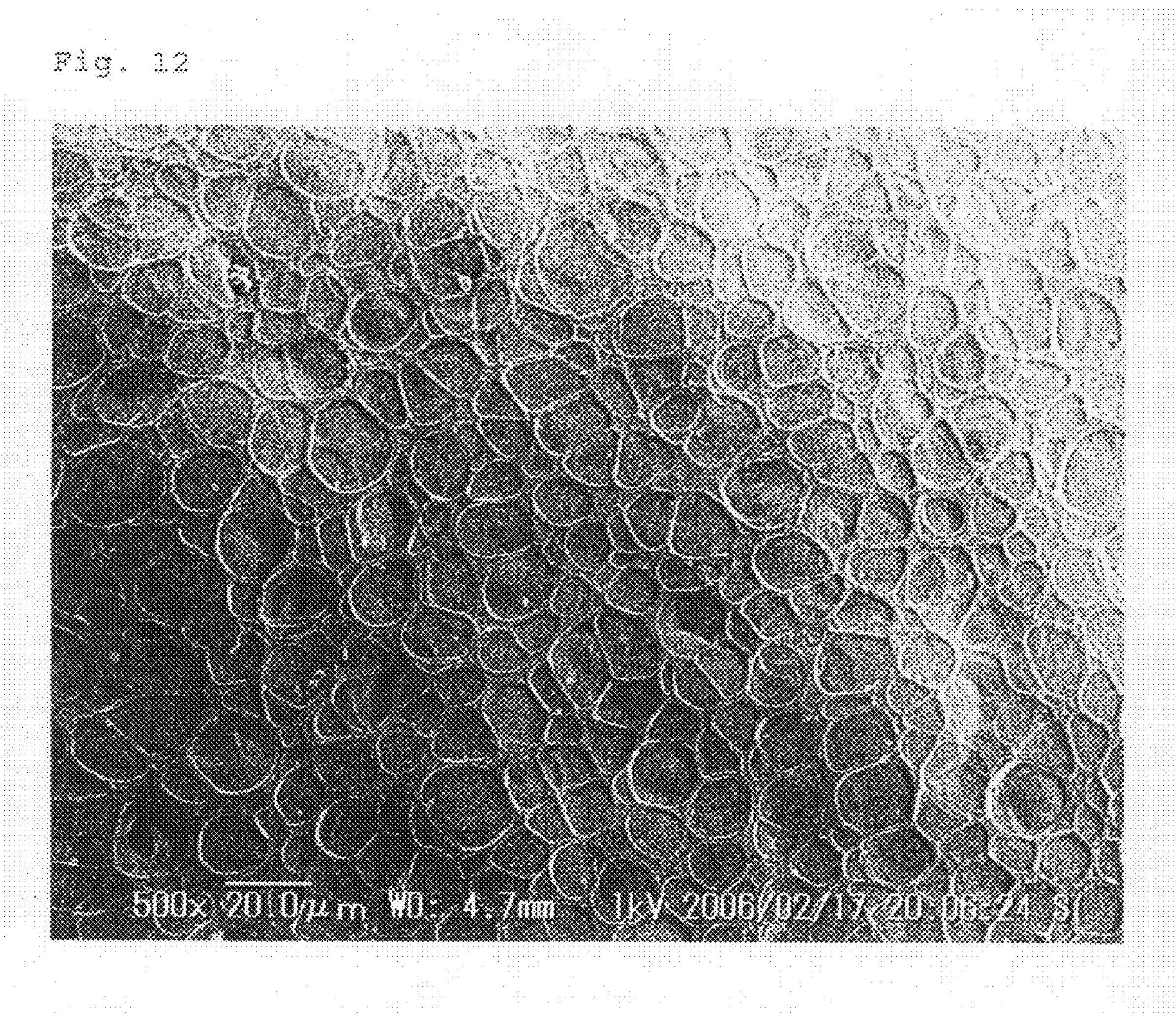
FIG. 12 is an electron micrograph (magnified 500 times) of the surface of an expanded bead in Example 2.

The same test as in Example 1 was conducted, except that 3.1 kg of liquid paraffin (Moresco White P150, made by Matsumura Oil Research, average carbon number of 25) was used as a mesh forming agent. The results are shown in Table 1. Scanning electron micrographs of the surface and cross section of the acrylic resin expandable beads and the surface of the expanded beads obtained in Example 2 are shown, respectively, in FIG. 10 (magnified 3000 times), FIG. 11 (magnified 1000 times), and FIG. 12 (magnified 500 times).

Example 3

Figure 13:
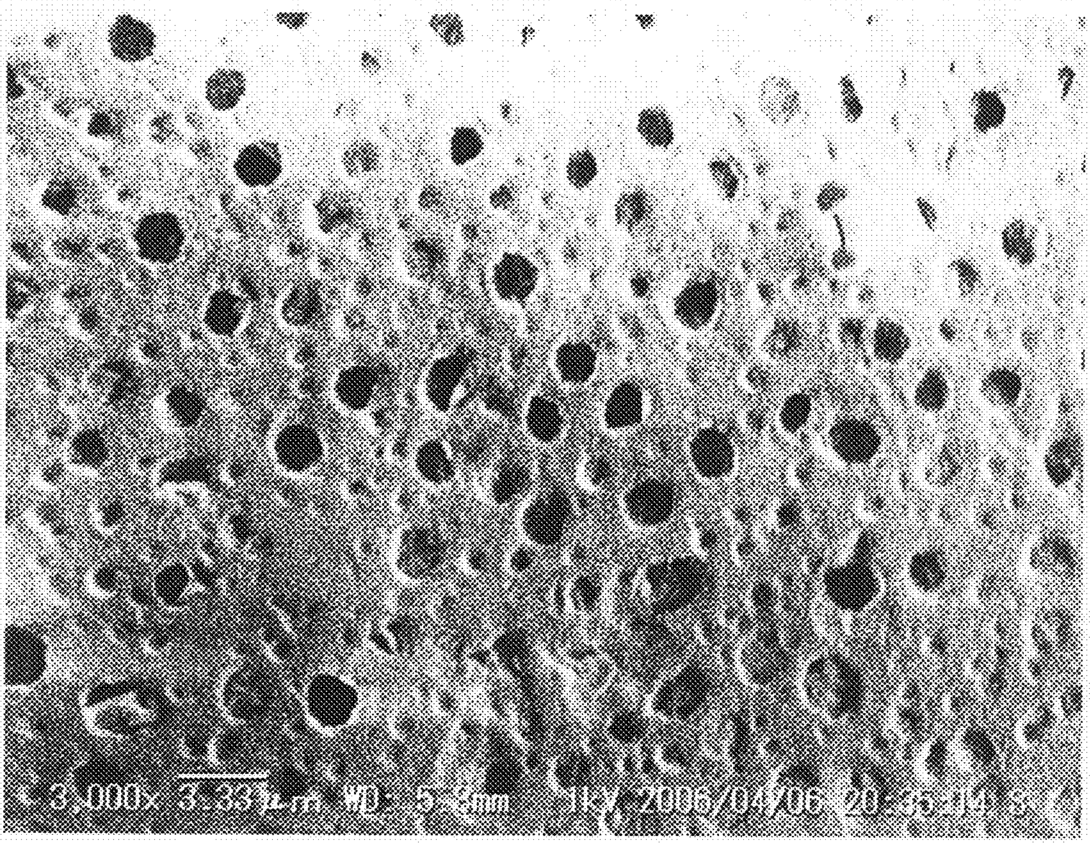
FIG. 13 is an electron micrograph (magnified 3000 times) of the surface of an expandable bead in Example 3.
Figure 14:
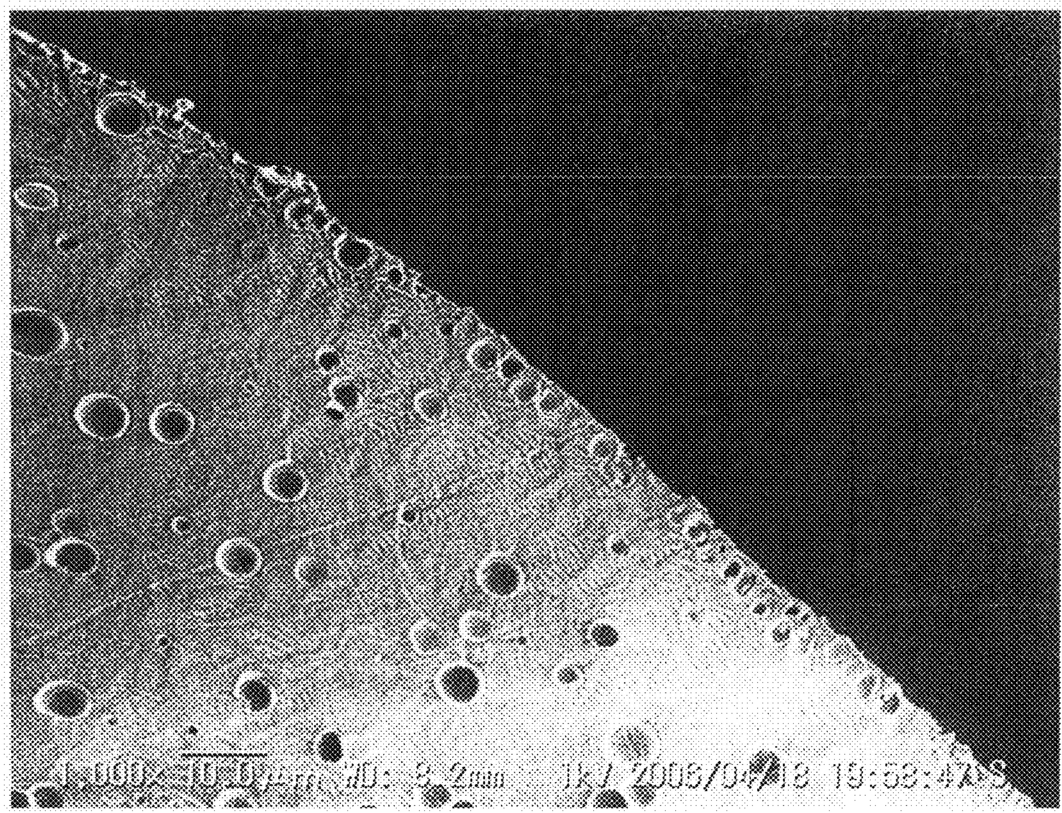
FIG. 14 is an electron micrograph (magnified 1000 times) of a cross section of an expandable bead in Example 3.
Figure 15:
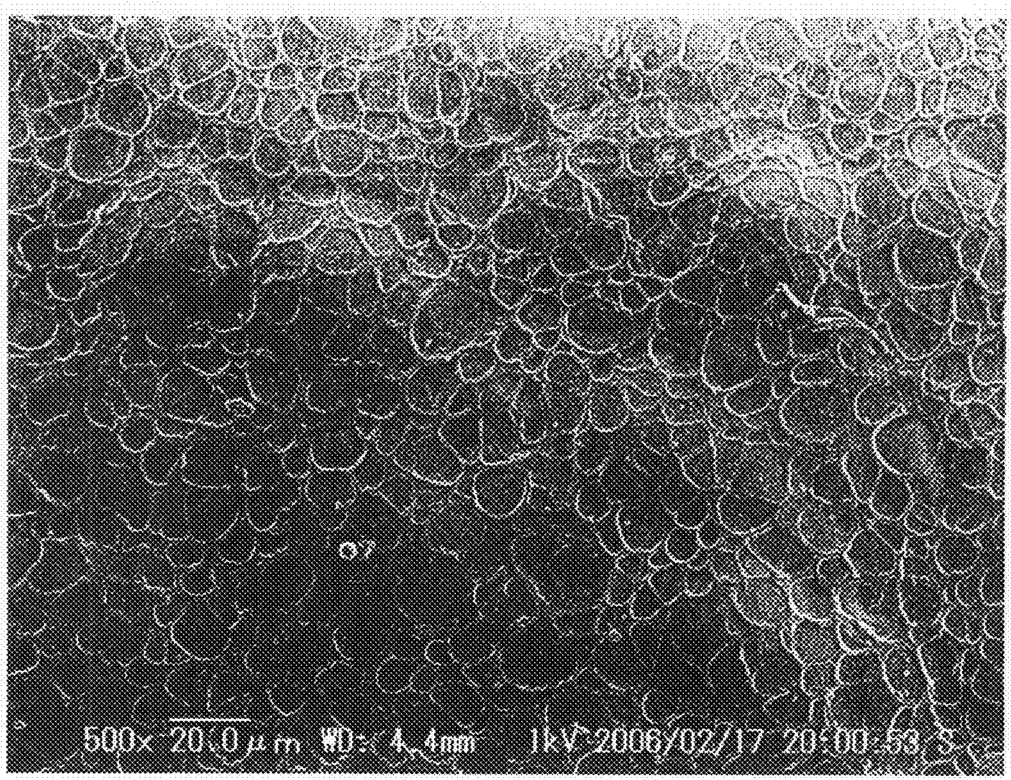
FIG. 15 is an electron micrograph (magnified 500 times) of the surface of an expanded bead in Example 3.

The same test as in Example 1 was conducted, except that 3.1 kg of liquid paraffin (Moresco White P350P, made by Matsumura Oil Research, average carbon number of 33) was used as a mesh forming agent. The results are shown in Table 1. Scanning electron micrographs of the surface and cross section of the acrylic resin expandable beads and the surface of the expanded beads obtained in Example 3 are shown, respectively, in FIG. 13 (magnified 3000 times), FIG. 14 (magnified 1000 times), and FIG. 15 (magnified 500 times).

Example 4

Figure 16:
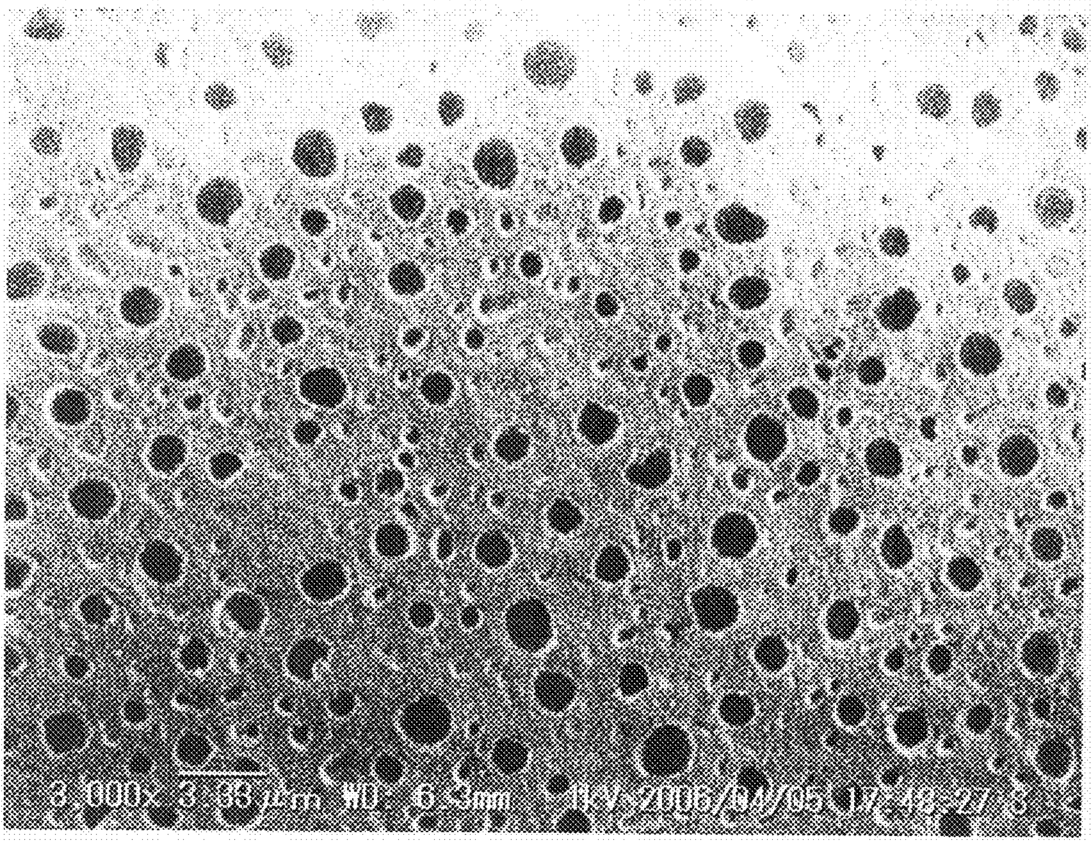
FIG. 16 is an electron micrograph (magnified 3000 times) of the surface of an expandable bead in Example 4.
Figure 17:
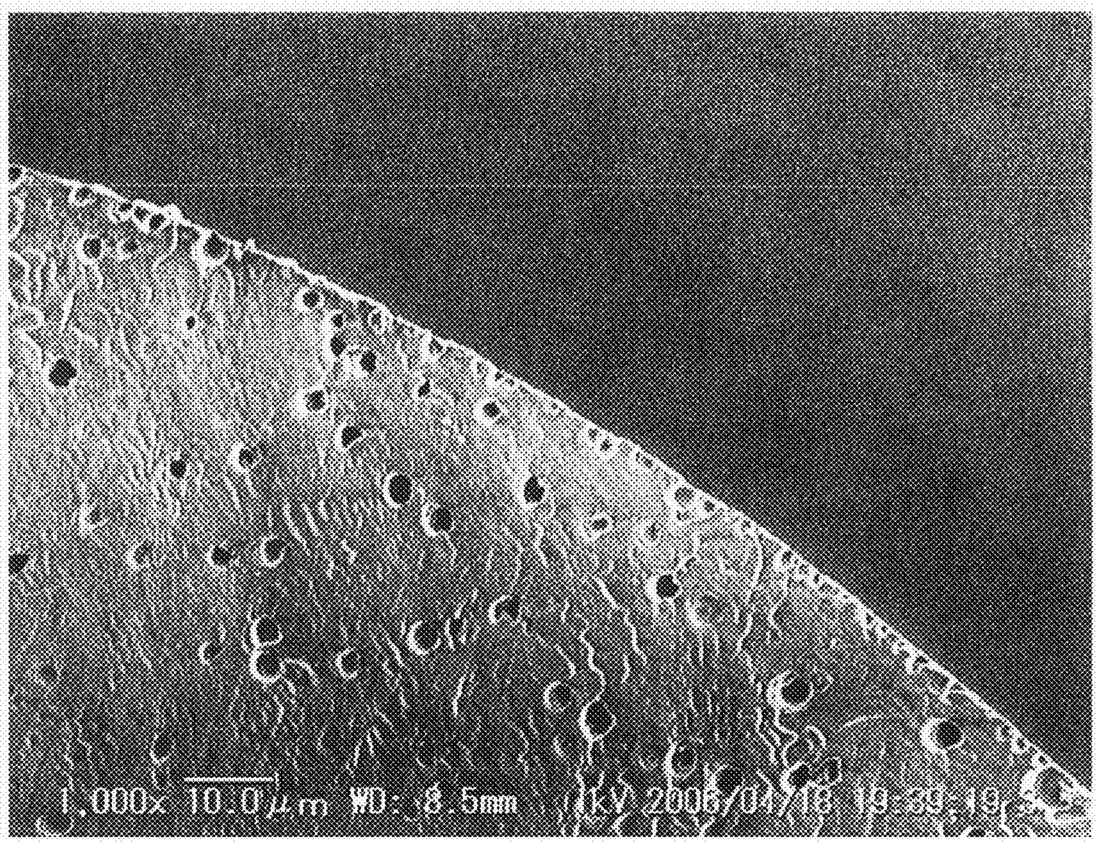
FIG. 17 is an electron micrograph (magnified 1000 times) of a cross section of an expandable bead in Example 4.
Figure 18:
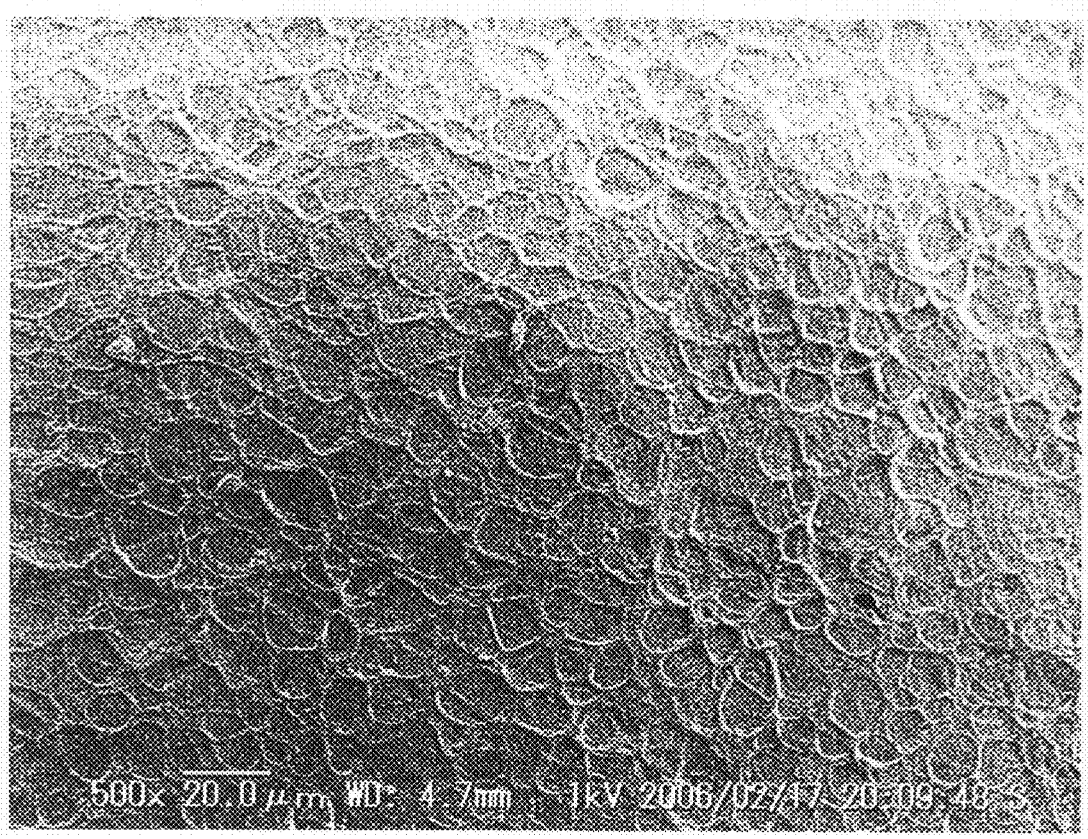
FIG. 18 is an electron micrograph (magnified 500 times) of the surface of an expanded bead in Example 4.

The same test as in Example 1 was conducted, except that 3.7 kg of glycerol stearate (a superhardened tallow made by NOF Corp.) was used as a mesh forming agent. The results are shown in Table 2. Scanning electron micrographs of the surface and cross section of the acrylic resin expandable beads and the surface of the expanded beads obtained in Example 4 are shown, respectively, in FIG. 16 (magnified 3000 times), FIG. 17 (magnified 1000 times), and FIG. 18 (magnified 500 times).

Example 5

Figure 19:
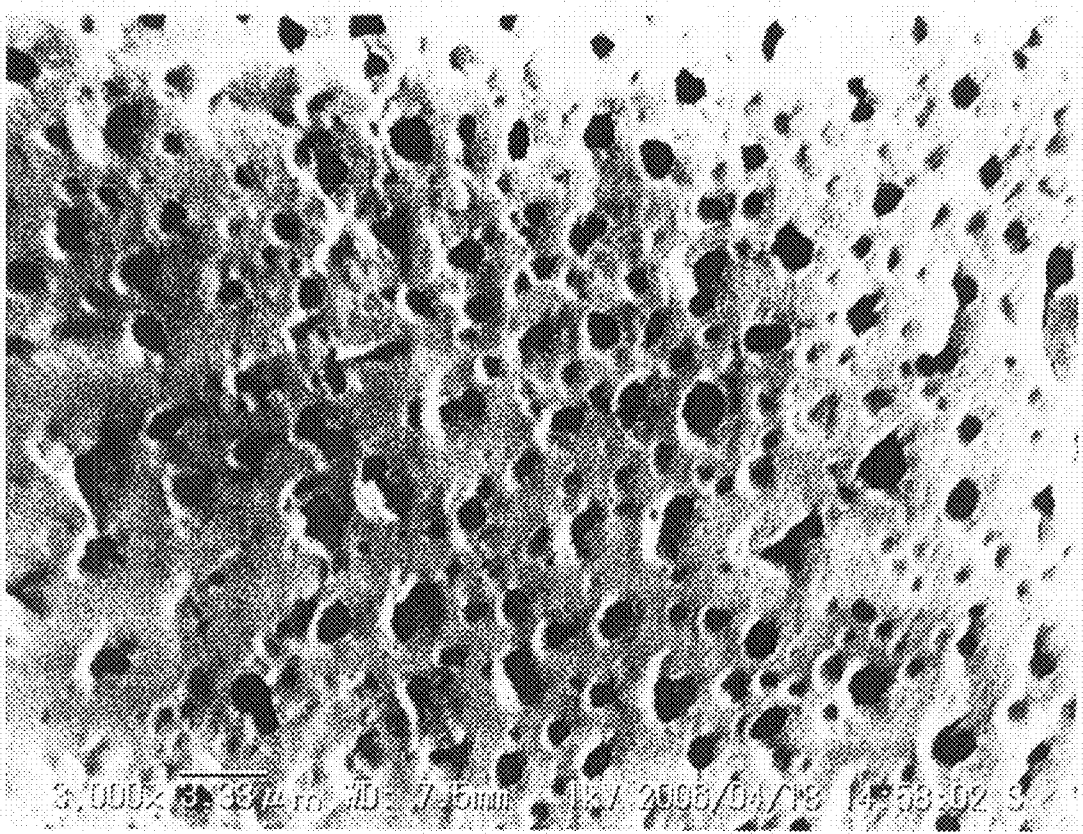
FIG. 19 is an electron micrograph (magnified 3000 times) of the surface of an expandable bead in Example 5.
Figure 20:
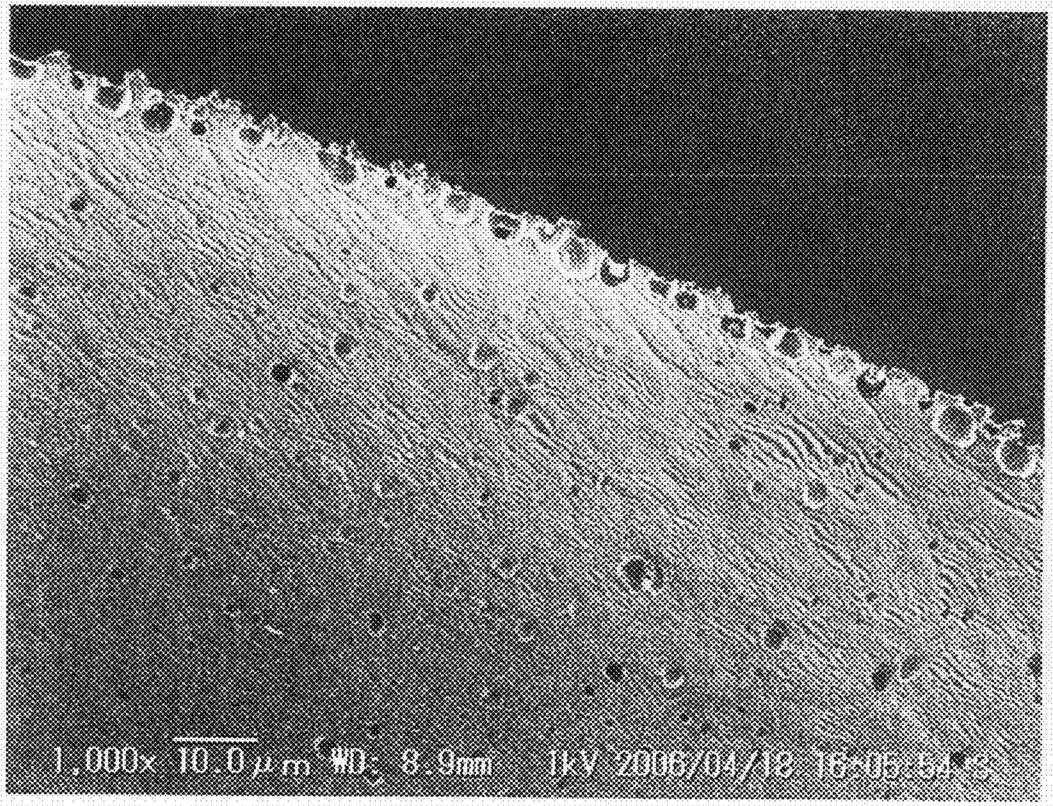
FIG. 20 is an electron micrograph (magnified 1000 times) of a cross section of an expandable bead in Example 5.
Figure 21:
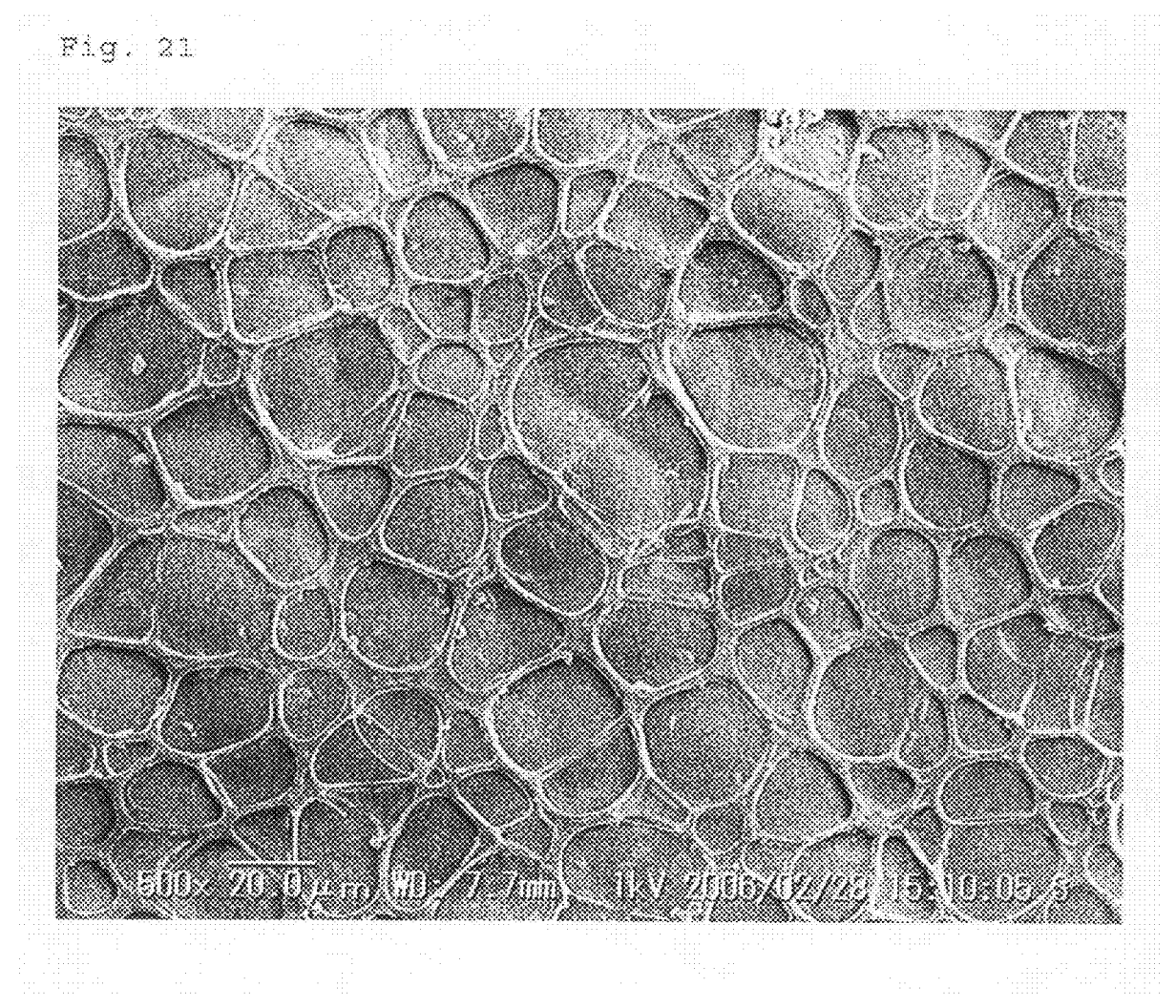

The same test as in Example 1 was conducted, except that 3.1 kg of a mixture of α-olefins with carbon numbers of 20 to 28 (Dialene 208, trade name of Mitsubishi Chemical) was used as a mesh forming agent. The results are shown in Table 2. Scanning electron micrographs of the surface and cross section of the acrylic resin expandable beads and the surface of the expanded beads obtained in Example 5 are shown, respectively, in FIG. 19 (magnified 3000 times), FIG. 20 (magnified 1000 times), and FIG. 21 (magnified 500 times).

Example 6

Figure 22:
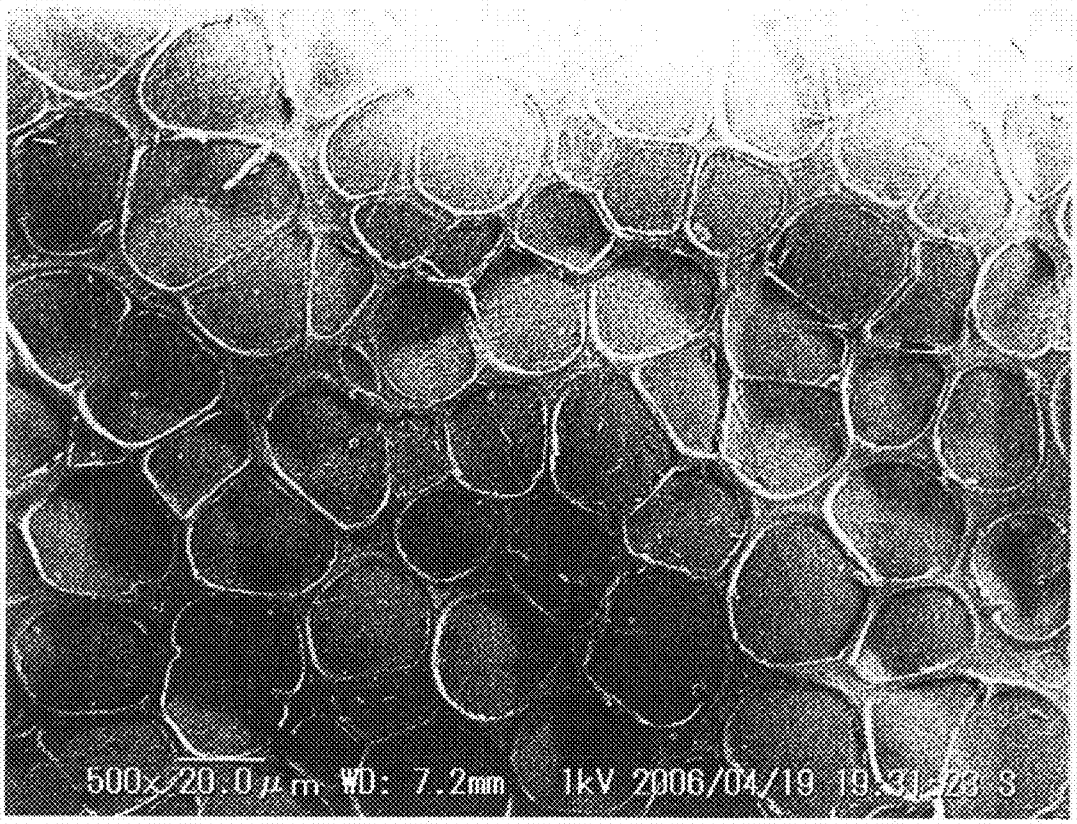
FIG. 22 is an electron micrograph (magnified 500 times) of the surface of an expanded bead in Example 6.

The same test as in Example 1 was conducted, except that 2.5 kg of liquid paraffin (Moresco White P60, made by Matsumura Oil Research, average carbon number of 20) was used as a mesh forming agent, and 0.9 kg of cyclohexane was used as a foaming auxiliary (plasticizer). The results are shown in Table 2. A scanning electron micrograph of the surface of the expanded beads obtained in Example 6 is shown in FIG. 22 (magnified 500 times).

Comparative Example 1

The same test as in Example 1 was conducted, except that 3.7 kg of xylene, which is a foaming auxiliary (plasticizer), was used in place of a mesh forming agent. The results are shown in Table 3. Scanning electron micrographs of the surface and cross section of the acrylic resin expandable beads and the surface of the expanded beads obtained in Comparative Example 1 are shown, respectively, in FIG. 8 (magnified 3000 times), FIG. 7 (magnified 1000 times), and FIG. 9 (magnified 500 times).

TABLE 2

| | Example 4 | | | Example 5 | | | Example 6 | | |
|---|---|---|---|---|---|---|---|---|---|
| Type of mesh forming agent | glycerol stearate | | | α-olefin | | | liquid paraffin ($C_{20}$) | | |
| Added amount of mesh forming agent (parts by weight) | 1.2 | | | 1.0 | | | 0.8 | | |
| Blowing agent content (wt %) | 8.9 | | | 7.2 | | | 8.0 | | |
| Number average molecular weight (Mn) | 38,000 | | | 19,000 | | | 27,000 | | |
| Weight average molecular weight (Mw) | 86,000 | | | 76,000 | | | 84,000 | | |
| Z average molecular weight (Mz) | 167,000 | | | 163,000 | | | 175,000 | | |
| Depression density (No./mm$^2$) | $2.4 \times 10^5$ | | | $1.6 \times 10^5$ | | | $0.9 \times 10^5$ | | |
| Bulk density of expanded beads (kg/m$^3$) | 21.5 | | | 20.2 | | | 20.0 | | |
| Average size of mesh openings on expanded bead surface (μm/opening) | 11 | | | 18 | | | 20 | | |
| Average size of expanded beads (μm/bead) | 53 | | | 56 | | | 70 | | |
| Max. contact pressure during molding and heating (MPa) | 0.98 | 1.08 | 1.18 | 0.093 | 0.098 | 0.103 | 0.088 | 0.098 | 0.104 |
| Cooling time during molding (min) | 0.7 | 0.9 | 0.8 | 1.6 | 5.8 | 7.5 | 1.5 | 3.7 | 5.9 |
| Shrinkage (%) | 1.0 | 1.7 | 1.4 | 0.2 | 0.3 | 0.3 | 0.4 | 0.6 | 0.9 |
| Internal fusion ratio of block foamed molded article (%) | 20 | 50 | 50 | 30 | 50 | 70 | 15 | 55 | 75 |
| Flexural strength of block foamed molded article (MPa) | — | 0.20 | — | — | 0.20 | — | — | 0.20 | — |

TABLE 3

| | Comp. Example 1 | | | Comp. Example 2 | | | Comp. Example 3 | | | Comp. Example 4 | | |
|---|---|---|---|---|---|---|---|---|---|---|---|---|
| Type of mesh forming agent | | xylene | | | D-limonene | | | bis(2-ethylhexyl) phthalate | | | liquid paraffin ($C_{20}$) | |
| Added amount of mesh forming agent (parts by weight) | | 1.0 | | | 1.0 | | | 1.0 | | | 1.0 | |
| Blowing agent content (wt %) | | 7.8 | | | 8.1 | | | 7.7 | | | 5.9 | |
| Number average molecular weight (Mn) | | 25,000 | | | 20,000 | | | 27,000 | | | 74,000 | |
| Weight average molecular weight (Mw) | | 84,000 | | | 73,000 | | | 81,000 | | | 249,000 | |
| Z average molecular weight (Mz) | | 176,000 | | | 156,000 | | | 176,000 | | | 549,000 | |
| Depression density (No./mm$^2$) | | $7.5 \times 10^3$ | | | $1.8 \times 10^5$ | | | $1.8 \times 10^5$ | | | 0 | |
| Bulk density of expanded beads (kg/m$^3$) | | 19.5 | | | 20.7 | | | 21.2 | | | 17.0 | |
| Average size of mesh openings on expanded bead surface (μm/opening) | | *1 | | | *1 | | | *1 | | | *1 | |
| Average size of expanded beads (μm/bead) | | 85 | | | 57 | | | 62 | | | 60 | |
| Max. contact pressure during molding and heating (MPa) | 0.078 | 0.080 | 0.083 | 0.076 | 0.079 | 0.083 | 0.078 | 0.080 | 0.084 | 0.083 | 0.088 | 0.093 |
| Cooling time during molding (min) | 1.8 | 25.5 | 39.6 | 1.6 | 21.2 | 42.9 | 2.0 | 28.5 | 46.6 | 6.5 | 16.0 | 42.9 |
| Shrinkage (%) | 0.3 | 0.2 | 0.2 | 15 | 0.6 | 0.5 | 0.7 | 0.6 | 0.5 | 0.7 | 0.6 | 0.5 |
| Internal fusion ratio of block foamed molded article (%) | 25 | 50 | 75 | 15 | 50 | 70 | 20 | 55 | 80 | 20 | 60 | 70 |
| Flexural strength of block foamed molded article (MPa) | — | 0.20 | — | — | 0.21 | — | — | 0.20 | — | — | 0.27 | — |

*1: Continuous ridges in mesh pattern could not be confirmed on expanded bead surface.

Comparative Example 2

Figure 23:
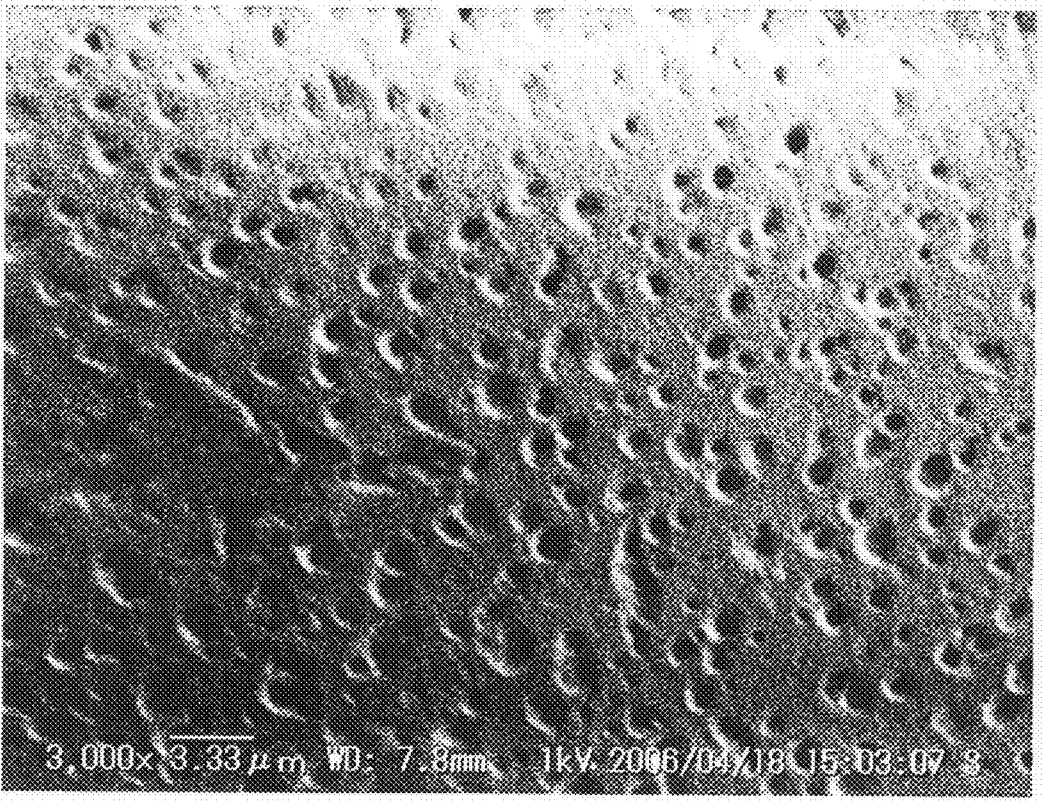
FIG. 23 is an electron micrograph (magnified 3000 times) of the surface of an expandable bead in Comparative Example 2.
Figure 24:
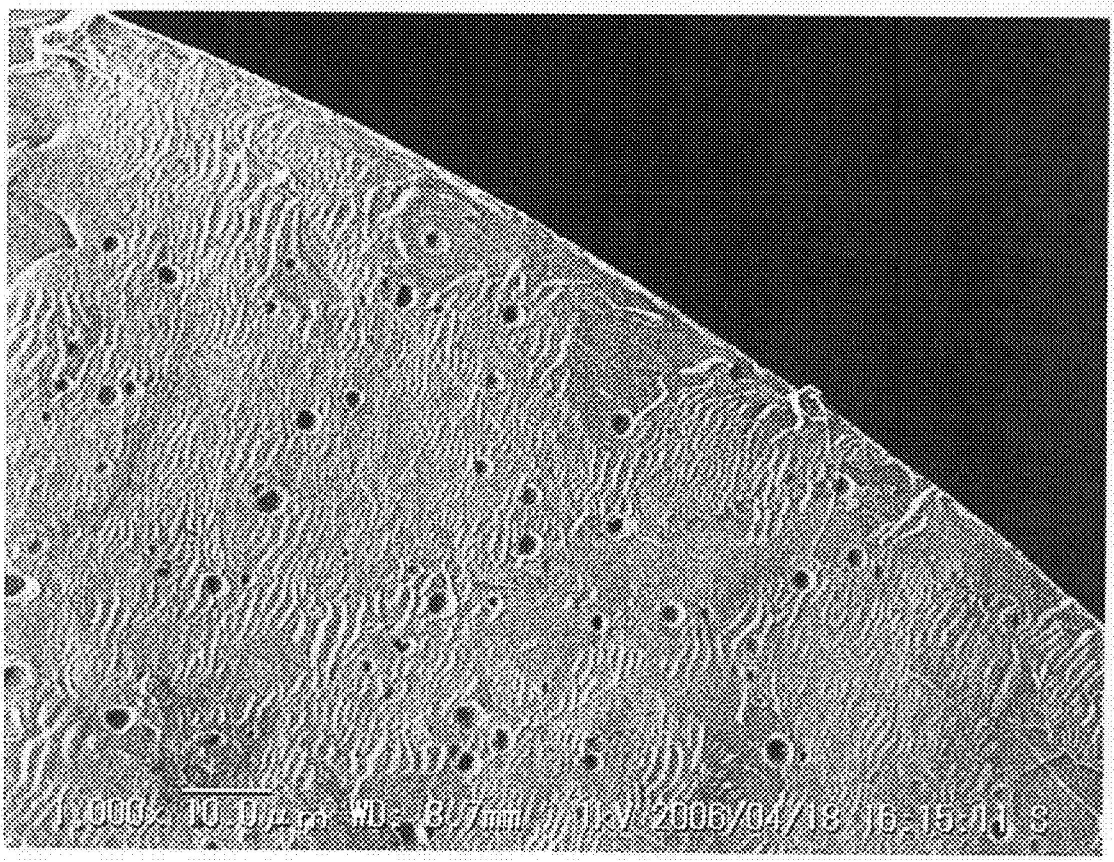
FIG. 24 is an electron micrograph (magnified 1000 times) of a cross section of an expandable bead in Comparative Example 2.
Figure 25:
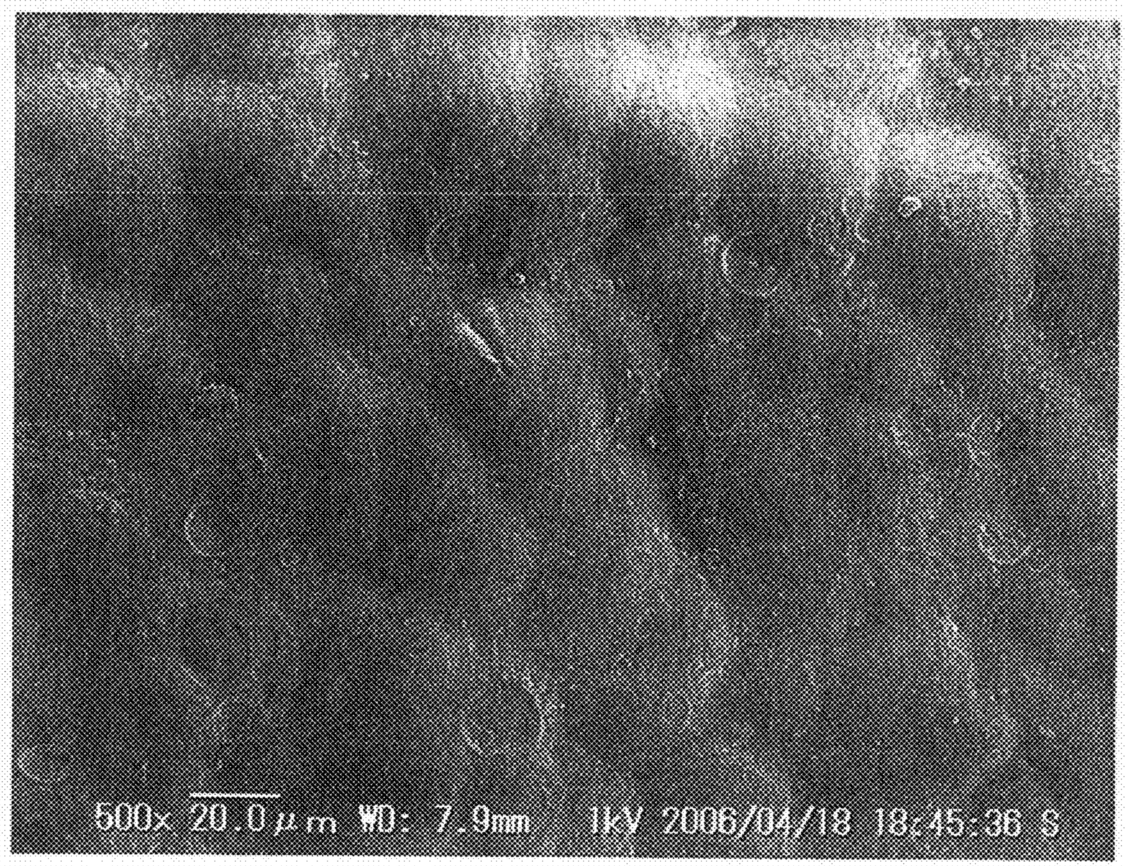
FIG. 25 is an electron micrograph (magnified 500 times) of the surface of an expanded bead in Comparative Example 2.

The same test as in Example 1 was conducted, except that 3.1 kg of D-limonene, which is a foaming auxiliary (plasticizer), was used in place of a mesh forming agent. The results are shown in Table 3. Scanning electron micrographs of the surface and cross section of the acrylic resin expandable beads and the surface of the expanded beads obtained in Comparative Example 2 are shown, respectively, in FIG. 23 (magnified 3000 times), FIG. 24 (magnified 1000 times), and FIG. 25 (magnified 500 times).

Comparative Example 3

Figure 26:
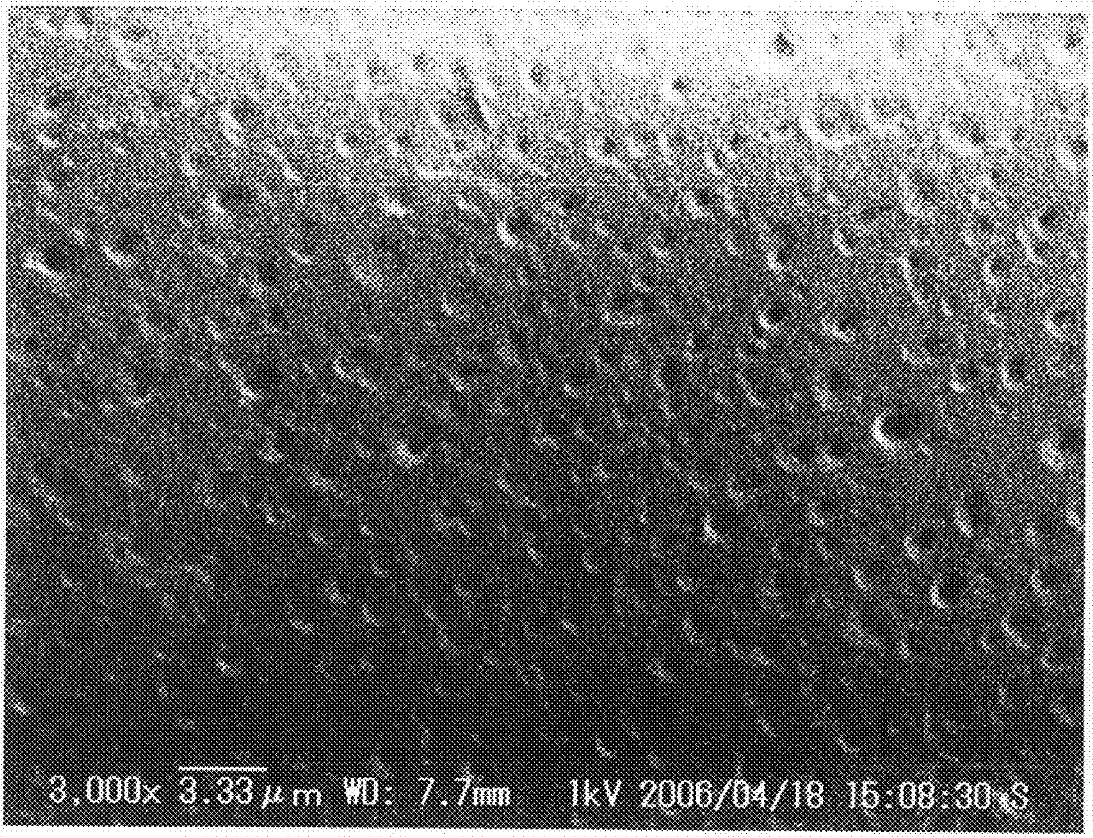
FIG. 26 is an electron micrograph (magnified 3000 times) of the surface of an expandable bead in Comparative Example 3.
Figure 27:
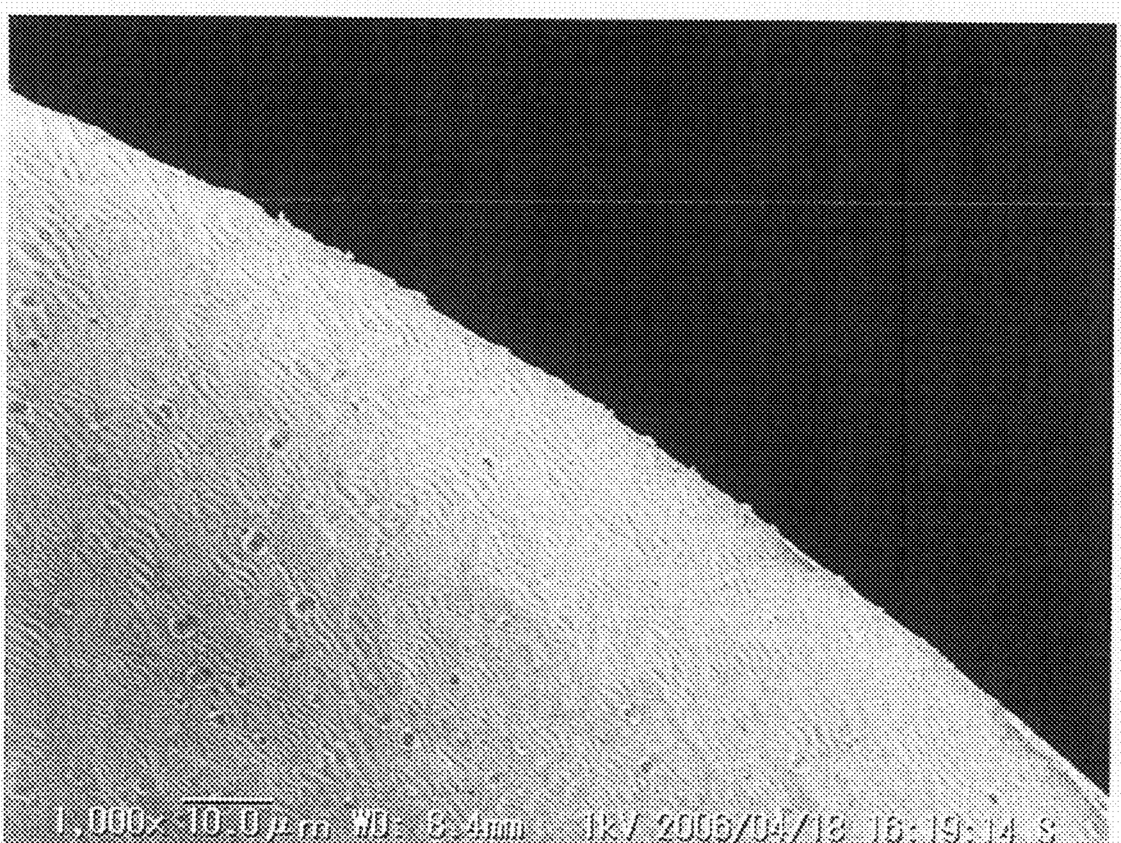
FIG. 27 is an electron micrograph (magnified 1000 times) of a cross section of an expandable bead in Comparative Example 3.
Figure 28:
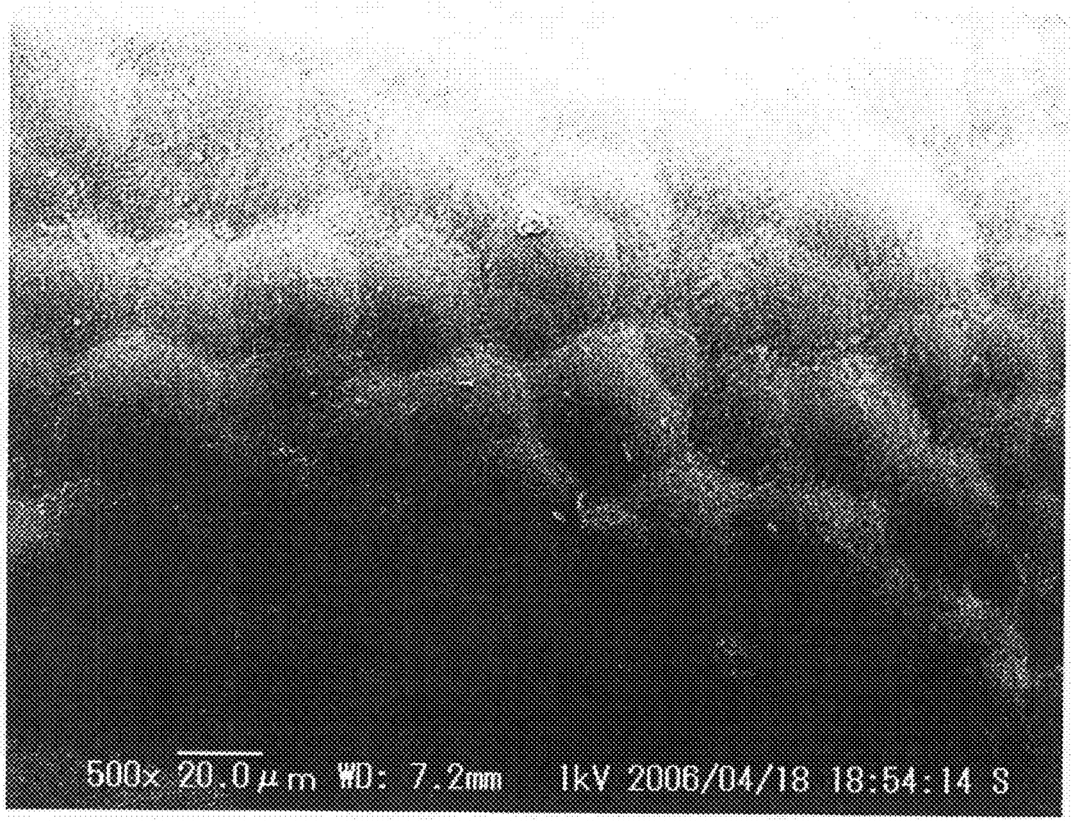
FIG. 28 is an electron micrograph (magnified 500 times) of the surface of an expanded bead in Comparative Example 3.

The same test as in Example 1 was conducted, except that 3.1 kg of bis(2-ethylhexyl) phthalate, which is a foaming auxiliary (plasticizer), was used in place of a mesh forming agent. The results are shown in Table 3. Scanning electron micrographs of the surface and cross section of the acrylic resin expandable beads and the surface of the expanded beads obtained in Comparative Example 3 are shown, respectively, in FIG. 26 (magnified 3000 times), FIG. 27 (magnified 1000 times), and FIG. 28 (magnified 500 times).

Comparative Example 4

Figure 29:
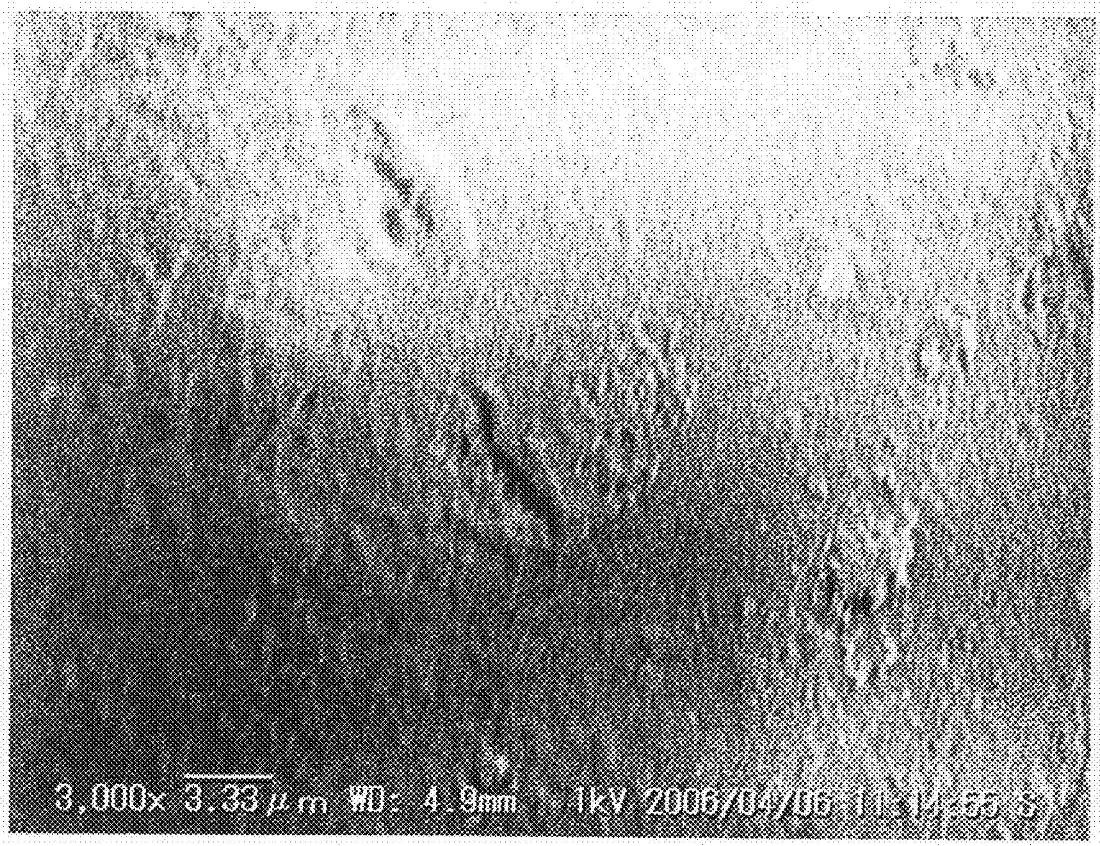
FIG. 29 is an electron micrograph (magnified 3000 times) of the surface of an expandable bead in Comparative Example 4.
Figure 30:
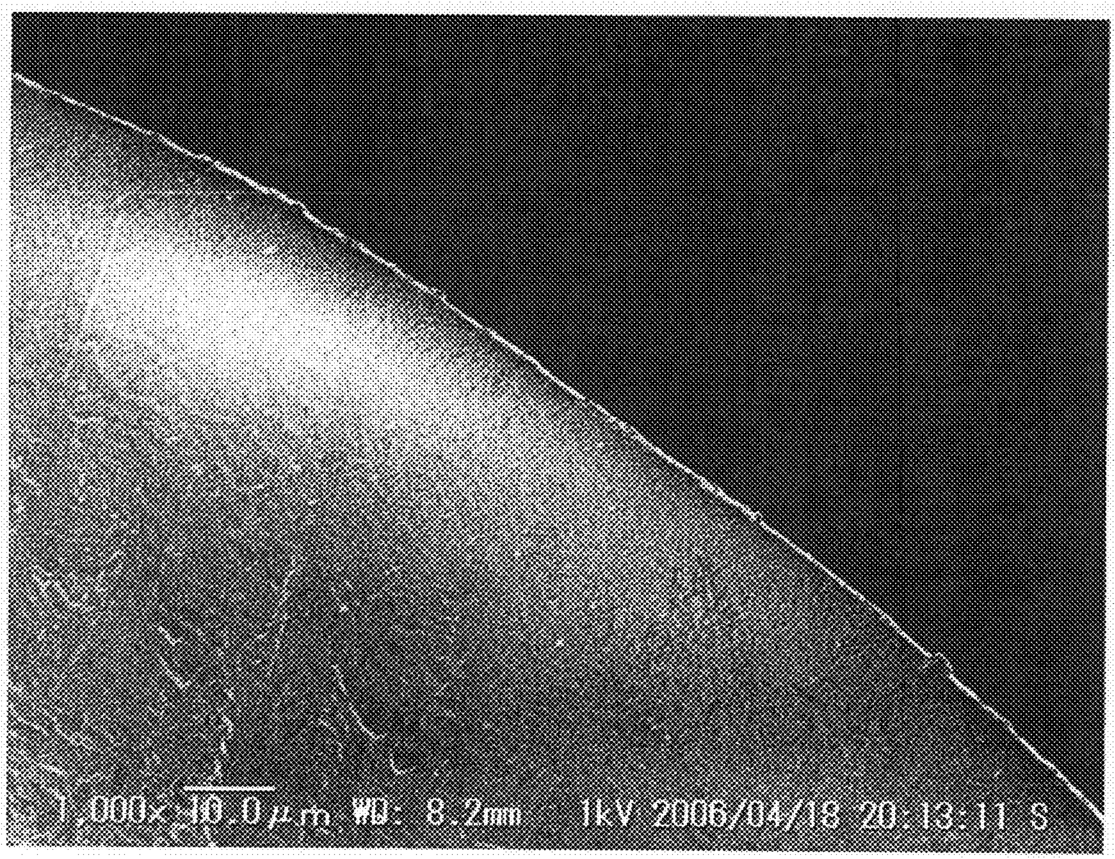
FIG. 30 is an electron micrograph (magnified 1000 times) of a cross section of an expandable bead in Comparative Example 4.

364 kg of deionized water, 0.4 kg of tertiary calcium phosphate (made by Taihei Kagaku Sangyo; used as a suspension agent), 50 g of sodium α-olefinsulfonate (Ripolin 440, made by Lion, 37% aqueous solution; used as a surfactant), and 0.56 kg of sodium acetate (used as electrolyte) were poured into an autoclave with an internal volume of 1 cubic meter and equipped with a stirrer. Next, 1.2 kg of t-butyl peroxy-2-ethylhexanoate (Perbutyl O, made by NOF Corp.) and 0.6 kg of t-butyl peroxy-2-ethylhexylmonocarbonate (Perbutyl E, made by NOF Corp.) (both used as polymerization initiators), 3.6 kg of the same liquid paraffin as that used in Example 1 (Moresco White P60, made by Matsumura Oil Research, average carbon number of 20; used as a mesh forming agent), and 0.4 kg of polyethylene wax (Polywax 1000, made by Toyo Petrolite; used as a cell controlling agent) were dissolved in 370 kg of styrene, and this solution was poured into the autoclave while the stirrer stirred the contents at 110 rpm. The inside of the autoclave was replaced with nitrogen, after which the temperature was raised to 90° C. over a period of one and a half hours. After 90° C. was reached, the temperature was further raised to 100° C. over 5 hours, then raised to 115° C. over one and a half hours, and then held at 115° C. for 5 hours, after which the system was cooled for about 6 hours to 30° C. During the temperature elevation from 90° C. to 100° C., at the fourth hour after 90° C. had been reached, 10 kg of pentane (a mixture of 80% n-pentane and 20% isopentane) and 21 kg of butane (a mixture of 70% n-butane and 30% isobutane) were added as blowing agents to the autoclave over a period of about 60 minutes. After the addition of the blowing agents, the stirring speed was lowered to 90 rpm. After cooling, the contents were taken out, nitric acid was added to dissolve the tertiary calcium phosphate adhering to the surface of the styrene resin expandable beads, and then this product was dewatered and washed in a centrifuge and any water adhering to the surface was removed with an air flow dryer, which gave styrene resin expandable beads with an average bead size of about 0.8 mm. These expandable beads were subjected to the same testing as in Example 1, the results of which are given in Table 3. Scanning electron micrographs of the surface and cross section of the styrene resin expandable beads obtained in Comparative Example 4 are shown, respectively, in FIG. 29 (magnified 3000 times) and FIG. 30 (magnified 1000 times).

Figure 31:
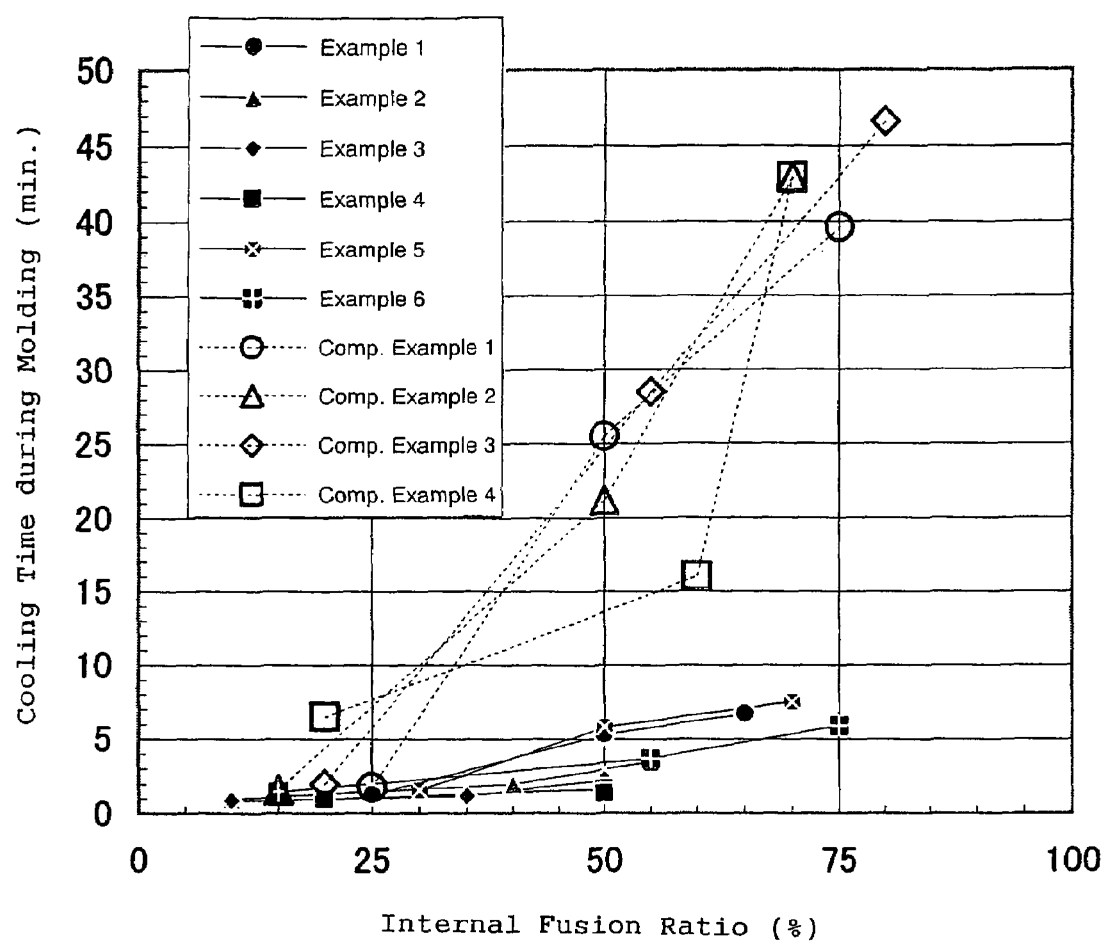
FIG. 31 is a graph of the relationship between the cooling (reduced pressure cooling) time during molding and the internal fusion ratio of the foamed molded article in Examples 1 to 6 and Comparative Examples 1 to 4.

FIG. 31 shows the relationship between the cooling (reduced pressure cooling) time during molding and the internal fusion ratio of the foamed molded article in Examples 1 to 6 and Comparative Examples 1 to 4.

The following can be understood from the working and comparative examples. It can be seen that countless surface cells, almost none of which are seen in the conventional products (Comparative Examples 1 to 3), are formed in the acrylic resin expandable beads obtained using liquid paraffin, a higher fatty acid ester, or an olefin as a mesh forming agent. It can also be seen that expanded beads obtained by foaming and expanding the above expandable beads have continuous ridges formed in a mesh pattern on their surface. Furthermore, it can be seen that even when a thick block foamed molded article is produced by in-mold molding using these expanded beads, even if it is heated enough for the expanded beads in the interior to fuse-bond, the cooling (reduced pressure cooling) time is markedly reduced as compared to the conventional products (Comparative Examples 1 to 3) (comparison at an internal fusion ratio of 50%).

Also, it is understood from Examples 1 to 3 that the size of mesh openings of the obtained expanded beads can be adjusted by varying the carbon number of the liquid paraffin used as a mesh forming agent.

In contrast, Comparative Examples 1 to 3 are cases of adding a compound that is useful as a plasticizer and used in the past in acrylic resin expandable beads, but it can be seen that the addition of these compounds forms almost no surface cells in the acrylic resin expandable beads, and that continuous ridges are not formed in a mesh pattern on the surface of the expanded beads obtained from the above expandable beads. Furthermore, it can be seen that even when a thick block foamed molded article is produced by in-mold molding using these expanded beads, if it is heated enough for the expanded beads in the interior to fuse-bond, cooling (reduced pressure cooling) takes much more time as compared to Examples 1 to 6 (comparison at an internal fusion ratio of 50%).

Also, it can be seen from Comparative Example 4 that the effect of the present invention is not obtained when liquid paraffin, which is useful as a mesh forming agent in the present invention, is applied to polystyrene resin expandable beads.

What is claimed is:

1. Acrylic resin expandable beads comprising:

an acrylic resin;

a blowing agent;

a mesh forming agent selected from the group consisting of liquid paraffin, higher fatty acid esters, and olefins added in an amount of 0.1 to 3 parts by weight per 100 parts by weight of the acrylic resin is added ahead of time to a raw material monomer of the acrylic resin prior to polymerization of the acrylic resin.

2. The acrylic resin expandable beads according to claim 1, the blowing agent comprising an organic physical blowing agent with a boiling point of 80° C. or lower.

3. The acrylic resin expandable beads according to claim 1, the blowing agent comprising a $C_3$ to $C_6$ hydrocarbon compound.

4. The acrylic resin expandable beads according to claim 1, the blowing agent comprising pentane.

5. The acrylic resin expandable beads according to claim 1, wherein an average bead size is from 0.3 to 2 mm.

6. Acrylic resin expanded beads formed from the acrylic resin expandable beads according to claim 1, wherein the expanded bead surfaces have continuous ridges in a mesh pattern.

7. The acrylic resin expanded beads according to claim 6, wherein an average size of mesh openings surrounded by the ridges is from 4 to 40 μm per opening.

8. The acrylic resin expanded beads according to claim 6, wherein the acrylic resin is a copolymer of a methacrylic ester monomer and an aromatic vinyl compound.

9. The acrylic resin expanded beads according to claim 6, wherein an average cell diameter is from 30 to 150 μm per cell.

10. A method for manufacturing a foamed molded article of acrylic resin expanded beads, wherein a mold cavity is filled with the acrylic resin expanded beads according to claim 6, and the expanded beads are heated within the mold cavity and fuse-bonded together, cooled, and then taken out of the mold cavity.

11. The method for manufacturing a foamed molded article of acrylic resin expanded beads according to claim 10, wherein the smallest dimension of space inside the mold cavity during in-mold molding is at least 15 cm.

12. A method for manufacturing a foamed molded article of acrylic resin expanded beads, wherein a mold cavity is filled with the acrylic resin expanded beads according to claim 7, and the expanded beads are heated within the mold cavity and fuse-bonded together, cooled, and then taken out of the mold cavity.

13. A method for manufacturing a foamed molded article of acrylic resin expanded beads, wherein a mold cavity is filled with the acrylic resin expanded beads according to claim 8, and the expanded beads are heated within the mold cavity and fuse-bonded together, cooled, and then taken out of the mold cavity.

14. A method for manufacturing a foamed molded article of acrylic resin expanded beads, wherein a mold cavity is filled with the acrylic resin expanded beads according to claim 9, and the expanded beads are heated within the mold cavity and fuse-bonded together, cooled, and then taken out of the mold cavity.

* * * * *